United States Patent
Iizuka et al.

(10) Patent No.: US 7,515,934 B2
(45) Date of Patent: Apr. 7, 2009

(54) MOBILE TERMINAL, PROGRAM FOR CONTROLLING MOBILE TERMINAL, PROGRAM FOR CALL-MANAGEMENT SERVER, AND CALL MANAGEMENT PROCESS

(75) Inventors: Fumiyuki Iizuka, Kawasaki (JP); Nobutsugu Fujino, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 644 days.

(21) Appl. No.: 11/005,096

(22) Filed: Dec. 6, 2004

(65) Prior Publication Data

US 2005/0282541 A1    Dec. 22, 2005

(30) Foreign Application Priority Data

Jun. 18, 2004    (JP)    ............... 2004-181575

(51) Int. Cl.
*H04M 1/00*    (2006.01)
*H04Q 7/20*    (2006.01)
*H04M 11/00*    (2006.01)

(52) U.S. Cl. .................. 455/553.1; 455/552.1; 455/436

(58) Field of Classification Search ................. 455/512, 455/552.1, 553.1, 550.1, 436, 439
See application file for complete search history.

(56) References Cited

U.S. PATENT DOCUMENTS

| 6,452,922 | B1* | 9/2002 | Ho ............................. 370/352 |
| 6,807,150 | B1* | 10/2004 | McNiff et al. ............... 370/230 |
| 7,231,179 | B2 | 6/2007 | Karusawa |
| 2002/0085516 | A1* | 7/2002 | Bridgelall ................... 370/329 |
| 2002/0147008 | A1* | 10/2002 | Kallio ........................ 455/426 |
| 2003/0134638 | A1* | 7/2003 | Sundar et al. ............... 455/435 |
| 2004/0002330 | A1 | 1/2004 | Chitrapu |
| 2004/0146021 | A1* | 7/2004 | Fors et al. ................... 370/331 |
| 2004/0266426 | A1* | 12/2004 | Marsh et al. .............. 455/426.2 |
| 2005/0119005 | A1* | 6/2005 | Segal et al. ................. 455/445 |

FOREIGN PATENT DOCUMENTS

| DE | 203 09 954 U1 | 10/2003 |
| JP | 2002-125069 | 4/2002 |
| JP | A 2003-339083 | 11/2003 |
| JP | 2004072136 | 3/2004 |
| JP | A 2004-088154 | 3/2004 |
| JP | A 2004-112243 | 4/2004 |
| JP | A 2005-525013 | 8/2005 |
| WO | WO 01/10150 | 2/2001 |
| WO | WO 03/094017 A1 | 11/2003 |

* cited by examiner

*Primary Examiner*—Tilahun B Gesesse
(74) *Attorney, Agent, or Firm*—Greer, Burns & Crain, Ltd.

(57) ABSTRACT

A mobile terminal which can use a plurality of communication mediums enabling a wireless call by dynamically switching between the plurality of communication mediums during a call. When the condition of communication realized by a call-through-LAN unit deteriorates and deviates from a predetermined criterion during a first call through the call-through-LAN unit, the call switch unit establishes a connection through the call-through-telephone-network unit, and switches from the first call to a second call through the call-through-telephone-network unit. Thereafter, when the condition of communication realized by the call-through-LAN unit is restored to satisfy the predetermined criterion during the second call, the call switch unit switches from the second call to a third call through the call-through-LAN unit.

8 Claims, 16 Drawing Sheets

FIG. 7

216a DESTINATION INFORMATION

| USER (Virtual ID) | DESTINATION | PRIORITY | CONDITION | IDENTIFICATION OF TERMINAL |
|---|---|---|---|---|
| USER1@abcd.com | 01234567@telgw.abcd.com | MEDIUM | USABLE | TERMINAL 1 |
| USER1@abcd.com | ADDRESS OF MOBILE TERMINAL | HIGH | UNUSABLE | TERMINAL 1 |
| USER1@abcd.com | ADDRESS OF IP TELEPHONE | LOW | USABLE | - |
| USER2@abcd.com | | HIGH | USABLE | - |
| ... | ... | ... | ... | ... |

216b CALL INFORMATION

| STATUS OF CALL | DESTINATION | CALLER |
|---|---|---|
| ORIGINATING | USER1@abcd.com | USER2@abcd.com |
| CONTINUING | USER3@abcd.com | USER4@abcd.com |
| ... | ... | ... |

FIG. 8

MOBILE TERMINAL, PROGRAM FOR CONTROLLING MOBILE TERMINAL, PROGRAM FOR CALL-MANAGEMENT SERVER, AND CALL MANAGEMENT PROCESS

CROSS-REFERENCE TO RELATED APPLICATIONS

This application is based upon and claims the benefits of priority from the prior Japanese Patent Application No. 2004-181575, filed on Jun. 18, 2004, the entire contents of which are incorporated herein by reference.

BACKGROUND OF THE INVENTION

1) Field of the Invention

The present invention relates to a mobile terminal, a program for controlling a mobile terminal, a program for a call-management server, and a call-management process for performing wireless communication, and in particular to a mobile terminal, a program for controlling a mobile terminal, a program for a call-management server, and a call-management process which can use a plurality of communication means.

2) Description of the Related Art

In recent years, use of the VoIP (Voice over Internet Protocol) technology for making a voice call through the Internet or an intranet is widely spreading. The VoIP technology enables transmission of voice information and voice calls between terminals by use of data communication protocols in computer networks. Therefore, the VoIP technology can be applied to any networks in which predetermined data communication protocols are used, regardless of whether the networks are wired or wireless.

Therefore, it is possible to realize wireless IP (Internet Protocol) telephone equipment by implementing in telephone equipment the function of performing data communication by use of a wireless LAN (Local Area Network). The use of the wireless IP telephone enables to make a call in the vicinity of a base station of the wireless LAN. In addition, when a roaming function is implemented, the use of the wireless IP telephone enables to make a call while the caller moves between base stations, for example, as disclosed in Japanese Unexamined Patent Publication No. 2002-125069.

Further, the above functions of the wireless IP telephone can be implemented in a mobile telephone used in a mobile telephone network or a PHS (personal handyphone system) network. Furthermore, it is possible to implement the functions of the mobile telephone or a PHS terminal in a personal digital (data) assistant (PDA) having the functions of the wireless IP telephone.

Moreover, the VoIP technique can be used on a telephone line in a mobile telephone network, a PHS network, or the like. However, the narrow bandwidth of the telephone line is likely to cause a voice interruption or a great delay. Therefore, it is necessary to properly use the VoIP technique in the following manner. That is, the VoIP technique is used in a network having a great bandwidth such as a wireless LAN, and is not used on a telephone line in a mobile telephone network, a PHS network, or the like which has a narrow bandwidth. Normally, one of the VoIP call function and the call function using a telephone line is selected based on the condition of communication or the like before a call is initiated.

In the case of the mobile communication, the condition of communication varies with movement of the mobile terminal. Therefore, the condition of communication can deteriorate during a call.

However, according to the conventional techniques, it is impossible to dynamically switch between the function of the call through a telephone line and the function of the VoIP call through a computer network according to the circumstances so as to smoothly continue a call.

In addition, when both of the function of realizing the call through a telephone line and the function of realizing the VoIP call through a computer network are on standby in a mobile terminal, the power consumption becomes extremely great. For example, the wireless LAN devices consume more electric power than the mobile telephones. The causes of the great power consumption of the wireless LAN devices are as follows.

The MAC-layer processing in the wireless LAN devices is performed in accordance with CSMA/CA (Carrier Sense Multiple Access with Collision Avoidance), which is different from TDMA (Time Division Multiple Access) in that each wireless LAN device must detect (listen to) signals from other terminals during idling. Therefore, the power consumption in a typical wireless LAN device during idling is as great as 1,150 mW in the case where the transmission power is 1,650 mW and the reception power is 1,400 mW. On the other hand, the power consumption in a typical card-type PHS device during idling is tens of milliwatts. Although a function called PSM (Power Saving Mode), which is a function of suppressing the power consumption of a device by making the device sleep as long as possible during idling, is standardized for the wireless LAN devices, many wireless LAN devices are not implemented with the PSM function.

As explained above, when the VoIP function of a mobile telephone which is network-connected to a wireless LAN is on standby, the battery in the mobile telephone runs out in a short time. Therefore, it is desired that only one of the function of realizing a call through a telephone line and the function of realizing a VoIP call through a computer network stands by.

SUMMARY OF THE INVENTION

The present invention is made in view of the above problems, and the object of the present invention is to provide a mobile terminal, a program for controlling a mobile terminal, a program for a call-management server, and a call-management process for performing wireless communication which are able to use a plurality of communication mediums enabling a wireless call, by dynamically switching between the plurality of communication mediums during a call.

In order to accomplish the above object, a mobile terminal for making a wireless call is provided. The mobile terminal comprises: a call-through unit which has a function of making a call through a wireless LAN; a call-through-telephone-network unit which has a function of making a call through a wireless telephone network; and a call switch unit which establishes a connection through the call-through-telephone-network unit and switches from a first call through the call-through-LAN unit to a second call through the call-through-telephone-network unit when a condition of communication realized by the call-through-LAN unit deteriorates and deviates from a predetermined criterion during the first call, and switches from a third call through the call-through-telephone-network unit to a fourth call through the call-through-LAN unit when the condition of communication realized by the call-through-LAN unit is restored to satisfy the predetermined criterion during the third call.

In addition, in order to accomplish the aforementioned object, a mobile-terminal-control program is provided. The mobile-terminal-control program is to be executed by a computer, and makes the computer perform a process for controlling a mobile terminal. The mobile terminal includes a call-through-LAN unit which has a function of making a call through a wireless LAN, and a call-through-telephone-network unit which has a function of making a call through a wireless telephone network. The above process comprises the steps of: (a) establishing a connection through the call-through-telephone-network unit and switching from a first call through the call-through-LAN unit to a second call through the call-through-telephone-network unit, when a condition of communication realized by the call-through-LAN unit deteriorates and deviates from a predetermined criterion during the first call; and (b) switching from the second call to a third call through the call-through-LAN unit, when the condition of communication realized by the call-through-LAN unit is restored to satisfy the predetermined criterion during the second call.

Further, in order to accomplish the aforementioned object, a call-management-server program is provided. The call-management-server program is to be executed by a computer, and makes the computer perform a call-management process for management of calls between telephone equipment and a mobile terminal. The call-management process comprises the steps of: (a) establishing, by a call-through-telephone-network management unit, a connection between the mobile terminal and the telephone equipment through a wireless telephone network when an incoming call from the mobile terminal is received through the wireless telephone network during a call placed between the telephone equipment and the mobile terminal through a wireless LAN; (b) disconnecting, by a call-through-LAN management unit, a first session established with the mobile terminal through the wireless LAN; (c) establishing, by the call-through-LAN management unit, a second session with the mobile terminal through the wireless LAN when information indicating restoration of communication through the wireless LAN is received from the mobile terminal; and (d) disconnecting, by the call-through-telephone-network management unit, the connection between the mobile terminal and the telephone equipment through the wireless telephone network.

Furthermore, in order to accomplish the aforementioned object, a call-management process for management of calls between telephone equipment and a mobile terminal in a call-management server is provided. The call-management process comprises the steps of: (a) establishing, by a call-through-telephone-network management unit, a connection between the mobile terminal and the telephone equipment through a wireless telephone network when an incoming call from the mobile terminal is received through the wireless telephone network during a call placed between the telephone equipment and the mobile terminal through a wireless LAN; (b) disconnecting, by a call-through-LAN management unit, a first session established with the mobile terminal through the wireless LAN; (c) establishing, by the call-through-LAN management unit, a second session with the mobile terminal through the wireless LAN when information indicating restoration of communication through the wireless LAN is received from the mobile terminal; and (d) disconnecting, by the call-through-telephone-network management unit, the connection between the mobile terminal and the telephone equipment through the wireless telephone network.

The above and other objects, features and advantages of the present invention will become apparent from the following description when taken in conjunction with the accompanying drawings which illustrate preferred embodiment of the present invention by way of example.

BRIEF DESCRIPTION OF THE DRAWINGS

In the drawings:

FIG. 7 is a diagram illustrating an example of a data structure of destination information;

FIG. 8 is a diagram illustrating an example of a data structure of call information;

DESCRIPTION OF THE PREFERRED EMBODIMENTS

An embodiment of the present invention is explained below with reference to drawings.

First, an outline of the present invention which is realized in the embodiment is explained, and thereafter details of the embodiment are explained.

Figure 1:
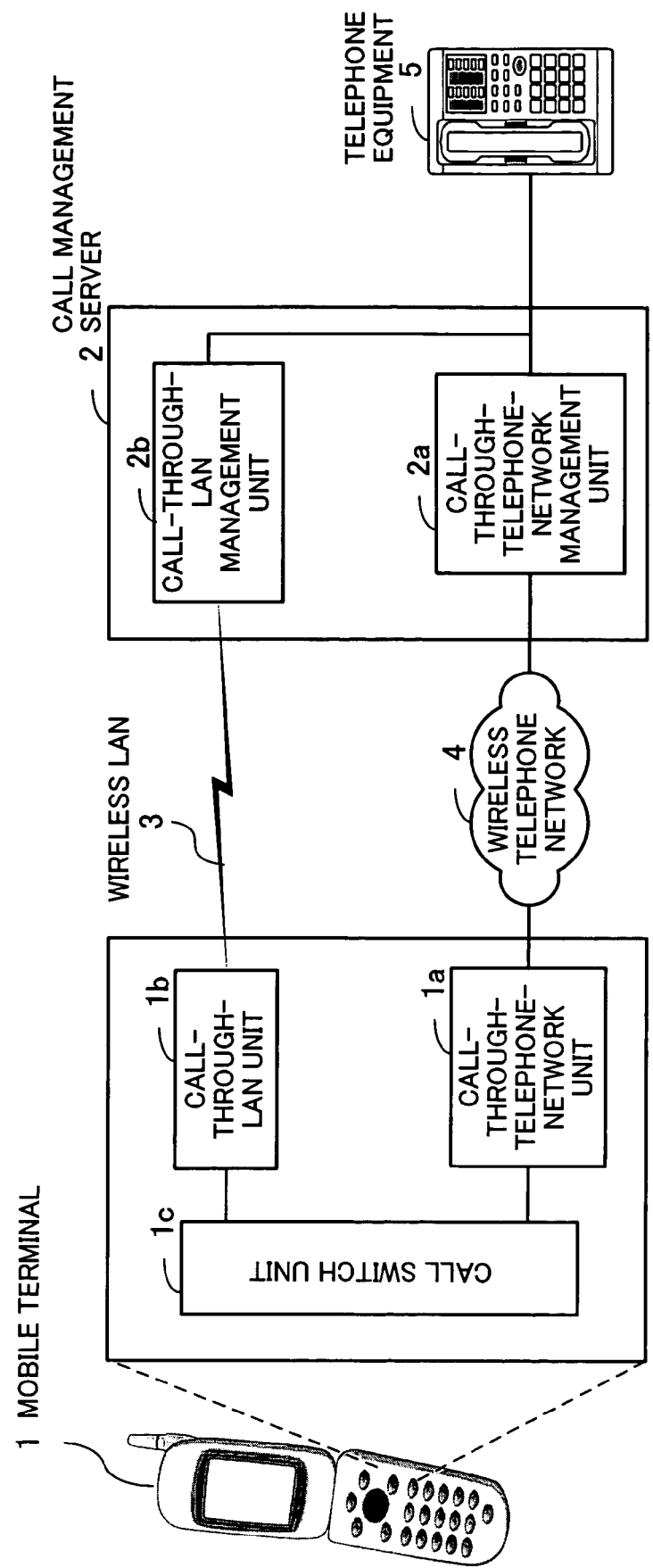
FIG. 1 is a conceptual diagram illustrating the present invention which is realized in an embodiment of the present invention.

FIG. 1 is a conceptual diagram illustrating the present invention which is realized in the embodiment. As illustrated in FIG. 1, a mobile terminal 1 and a call-management server 2 can communicate with each other through two wireless communication mediums, a wireless LAN 3 and a wireless telephone network 4. Telephone equipment 5 is connected to the call-management server 2, so that a call can be made between a user of the telephone equipment 5 and a user of the mobile terminal 1.

The mobile terminal 1 comprises a call-through-LAN unit 1a, a call-through-telephone-network unit 1b, and a call switch unit 1c.

The call-through-LAN unit 1b has a function of making a call through the wireless LAN 3, and can be stopped when the mobile terminal 1 does not perform communication through the wireless LAN 3.

The call-through-telephone-network unit 1a has a function of making a call through the wireless telephone network 4, and is on standby for an incoming call when no call is made through the call-through-telephone-network unit 1a.

When the condition of a connection realized by the call-through-LAN unit 1b deteriorates and deviates from a predetermined criterion during a call through the call-through-LAN unit 1b, the call switch unit 1c establishes a connection through the call-through-telephone-network unit 1a, and switches from the call through the call-through-LAN unit 1b to a call through the call-through-telephone-network unit 1a. When the condition of the connection realized by the call-through-LAN unit 1b is restored to satisfy the predetermined criterion during a call through the call-through-telephone-network unit 1a, the call switch unit 1c switches from the call through the call-through-telephone-network unit 1a to a call through the call-through-LAN unit 1b.

In addition, when the call switch unit 1c detects an incoming call to the call-through-telephone-network unit 1a, the call switch unit 1c determines the condition of the connection realized by the call-through-LAN unit 1b. When the condition of the connection realized by the call-through-LAN unit 1b is outside the predetermined criterion, the call switch unit 1c establishes a connection through the call-through-telephone-network unit 1a. When the condition of the connection realized by the call-through-LAN unit 1b satisfies the predetermined criterion, the call switch unit 1c activates the call-through-LAN unit 1b, and establishes a connection through the call-through-LAN unit 1b.

The condition of the connection realized by the call-through-LAN unit 1b (which is used as a reference for determining whether or not the connection is to be switched) can be determined based on, for example, the intensities of signals received from an access point, to which the LAN is to be connected. In this case, a threshold value of the intensities of signals can be determined to be the predetermined criterion.

The call-management server 2 comprises a call-through-telephone-network management unit 2a and a call-through-LAN management unit 2b.

When an incoming call is received from the mobile terminal 1 through the wireless telephone network 4 during a call placed between the telephone equipment 5 and the mobile terminal 1 through the wireless LAN 3, the call-through-telephone-network management unit 2a establishes a connection between the mobile terminal 1 and the telephone equipment 5 through the wireless telephone network 4. In addition, when a session is connected between the call-management server 2 and the mobile terminal 1 through the wireless LAN 3, the call-through-telephone-network management unit 2a disconnects a corresponding connection which has been established between the call-management server 2 and the mobile terminal 1 through the wireless telephone network 4.

Further, the call-through-telephone-network management unit 2a originates a call to the mobile terminal 1 through the wireless telephone network 4 in response to a request for connection which is transmitted from the telephone equipment 5.

When a connection is established through the wireless telephone network 4 in response to an incoming call, the call-through-LAN management unit 2b disconnects a corresponding session which has been set between the call-management server 2 and the mobile terminal 1 through the wireless LAN 3. In addition, when the call-management server 2 receives from the mobile terminal 1 information indicating restoration of communication between the call-management server 2 and the mobile terminal 1 through the wireless LAN 3, the call-through-LAN management unit 2b establishes a session between the call-management server 2 and the mobile terminal 1 through the wireless LAN 3.

Further, when the call-through-LAN management unit 2b receives from the telephone equipment 5 a request for connection to the mobile terminal 1, the call-through-LAN management unit 2b establishes a session between the call-through-LAN management unit 2b and the telephone equipment 5. In addition, when the call-through-LAN management unit 2b receives from the mobile terminal 1 a request for initiation of a session through the wireless LAN 3, the call-through-LAN management unit 2b establishes a session between the call-through-LAN management unit 2b and the mobile terminal 1, and establishes a connection between the telephone equipment 5 and the mobile terminal 1 through the wireless LAN 3.

In the system having the functions as explained above, when a request for connection is outputted from the telephone equipment 5 during absence of calls, the call-through-telephone-network management unit 2a originates a call to the mobile terminal 1 through the wireless telephone network 4. Then, the call-through-telephone-network unit 1a in the mobile terminal 1 detects the above call as an incoming call, and the call switch unit 1c determines the condition of the connection realized by the call-through-LAN unit 1b. When the condition of the connection realized by the call-through-LAN unit 1b does not satisfy the predetermined criterion, the call switch unit 1c establishes a connection through the call-through-telephone-network unit 1a. On the other hand, when the condition of the connection realized by the call-through-LAN unit 1b satisfies the predetermined criterion, the call switch unit 1c activates the call-through-LAN unit 1b, and establishes a connection through the call-through-LAN unit 1b.

Further, when the condition of the connection realized by the call-through-LAN unit 1b deviates from the predetermined criterion during a call through the call-through-LAN unit 1b, the call switch unit 1c establishes a connection through the call-through-telephone-network unit 1a, and switches from the call through the call-through-LAN unit 1b to a call through the call-through-telephone-network unit 1a. That is, the call-through-telephone-network unit 1a originates a call to the call-management server 2 through the wireless telephone network 4. In response to the origination of the call, the call-through-telephone-network management unit 2a in the call-management server 2 establishes a connection between the mobile terminal 1 and the telephone equipment 5 through the wireless telephone network 4. Then, the call-through-LAN management unit 2b disconnects a corresponding session which has been established between the mobile terminal 1 and the call-management server 2 through the wireless LAN 3.

Thereafter, when the condition of the connection realized by the call-through-LAN unit 1b is restored to satisfy the predetermined criterion during the call through the call-through-telephone-network unit 1a, the call switch unit 1c switches from the call through the call-through-telephone-network unit 1a to a call through the call-through-LAN unit 1b. That is, the call-through-LAN unit 1b sends to the call-management server 2 a request for initiation of a session through the wireless LAN 3. When the call-management server 2 receives the request, the call-through-LAN management unit 2b establishes a session between the call-management server 2 and the mobile terminal 1 through the wireless LAN 3, and establishes a connection between the telephone equipment 5 and the mobile terminal 1 through wireless LAN 3. Then, the call-through-telephone-network management unit 2a disconnects the connection which has been established between the telephone equipment 5 and the mobile terminal 1 through the wireless telephone network 4.

As explained above, it is possible to dynamically switch the communication medium for use in a call so that the call through the wireless LAN 3 has high priority. That is, even when the condition of the connection through the wireless LAN 3 varies during a call (for example, due to movement of the mobile terminal 1), it is possible to continue the call through the wireless LAN 3 as long as possible. Generally, no charge is billed for the calling time through the wireless LAN 3. Therefore, it is possible to save the telephone bill.

In addition, it is possible to stop the function of the call-through-LAN unit 1b during absence of calls, and start a call through the wireless LAN 3 when an incoming call is received through the wireless telephone network 4. Therefore, it is possible to minimize the power consumption in the call-through-LAN unit 1b during standby, and reduce the power consumption in the mobile terminal 1 during standby.

Hereinbelow, the embodiment of the present invention is explained in detail.

Figure 2:
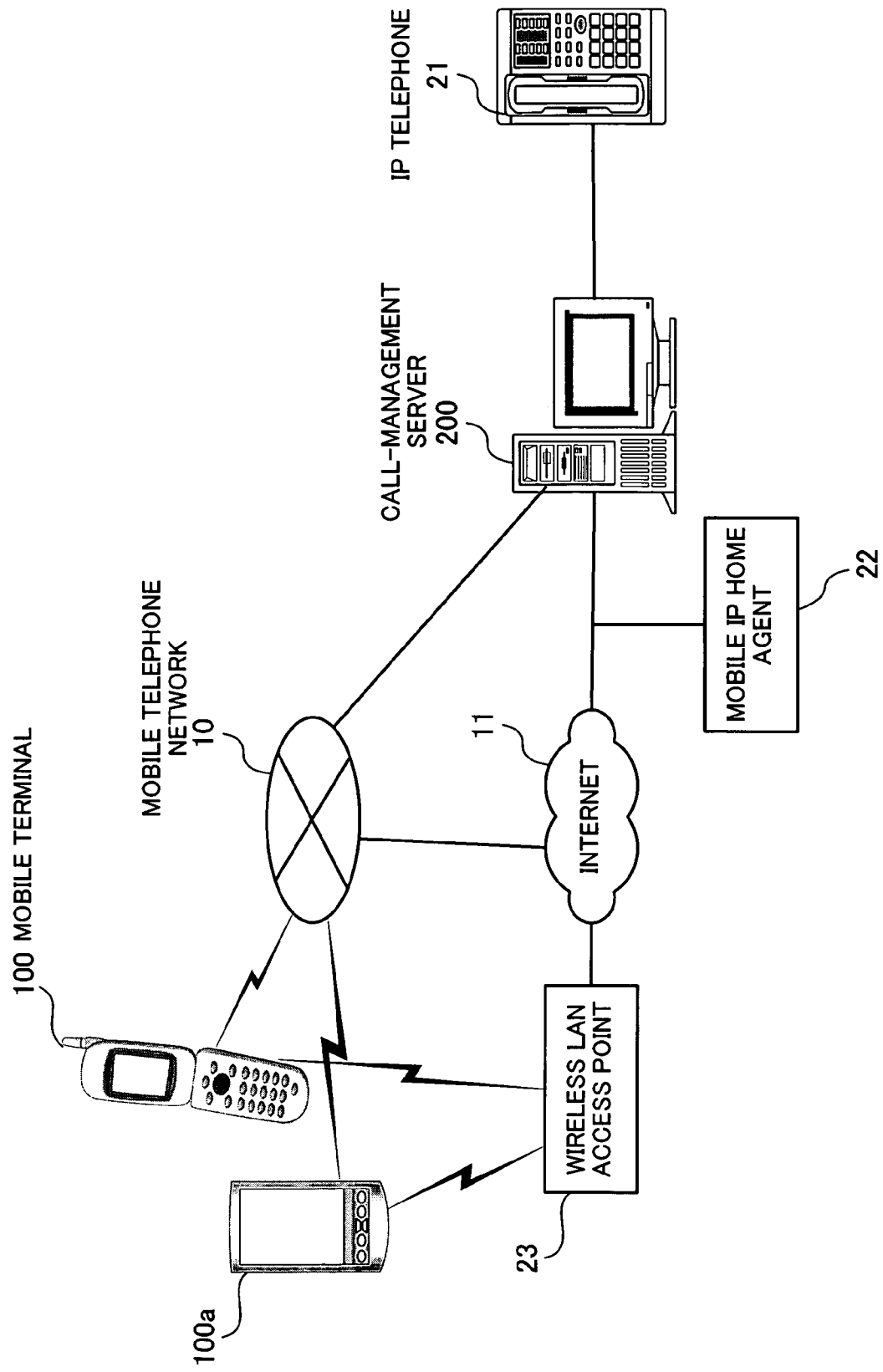
FIG. 2 is a diagram illustrating an example of a construction of a system of the embodiment of the present invention.

FIG. 2 is a diagram illustrating an example of a construction of a system of the embodiment of the present invention. In the present embodiment, a mobile telephone network 10 and the Internet 11 containing a wireless LAN are provided as the communication mediums through which calls can be made. An IP telephone 21 is connected through a call-management server 200 to the mobile telephone network 10 and the Internet 11. The IP telephone 21 has a function of making a VoIP call.

The call-management server 200 is connected to the mobile telephone network 10 and the Internet 11 performs medium conversion between the telephone line and the VoIP, and transfers call data. In addition, the call-management server 200 establishes and switches connections between the IP telephone 21 and the mobile terminals 100 and 100a.

A mobile IP home agent 22 is provided on a communication path between the call-management server 200 and the Internet 11. The mobile IP home agent 22 manages the current IP addresses of the mobile terminals 100 and 100a and the like, and relays VoIP packets to be transmitted to the mobile terminals 100 and 100a. That is, the mobile IP home agent 22 performs conversion into the current IP addresses of the mobile terminals 100 and 100a, and transmits the VoIP packets to the mobile terminals 100 and 100a.

A wireless LAN access point 23 is connected to the Internet 11, and performs communication with the mobile terminals 100 and 100a through the wireless LAN.

The mobile terminals 100 and 100a each have a function of making a call through the mobile telephone network 10 and a function of making a VoIP call through the Internet 11. When each of the mobile terminals 100 and 100a makes a call through the Internet 11, the mobile terminal performs wireless communication with the wireless LAN access point 23, and establishes a connection between the mobile terminal and the call-management server 200 through the wireless LAN access point 23.

According to the system having the above construction, it is possible to make a call between the IP telephone 21 and each of the mobile terminals 100 and 100a. Hereinbelow, the embodiment of the present invention is explained by taking as an example a case where a call is made between the mobile terminal 100 and the IP telephone 21.

Figure 3:
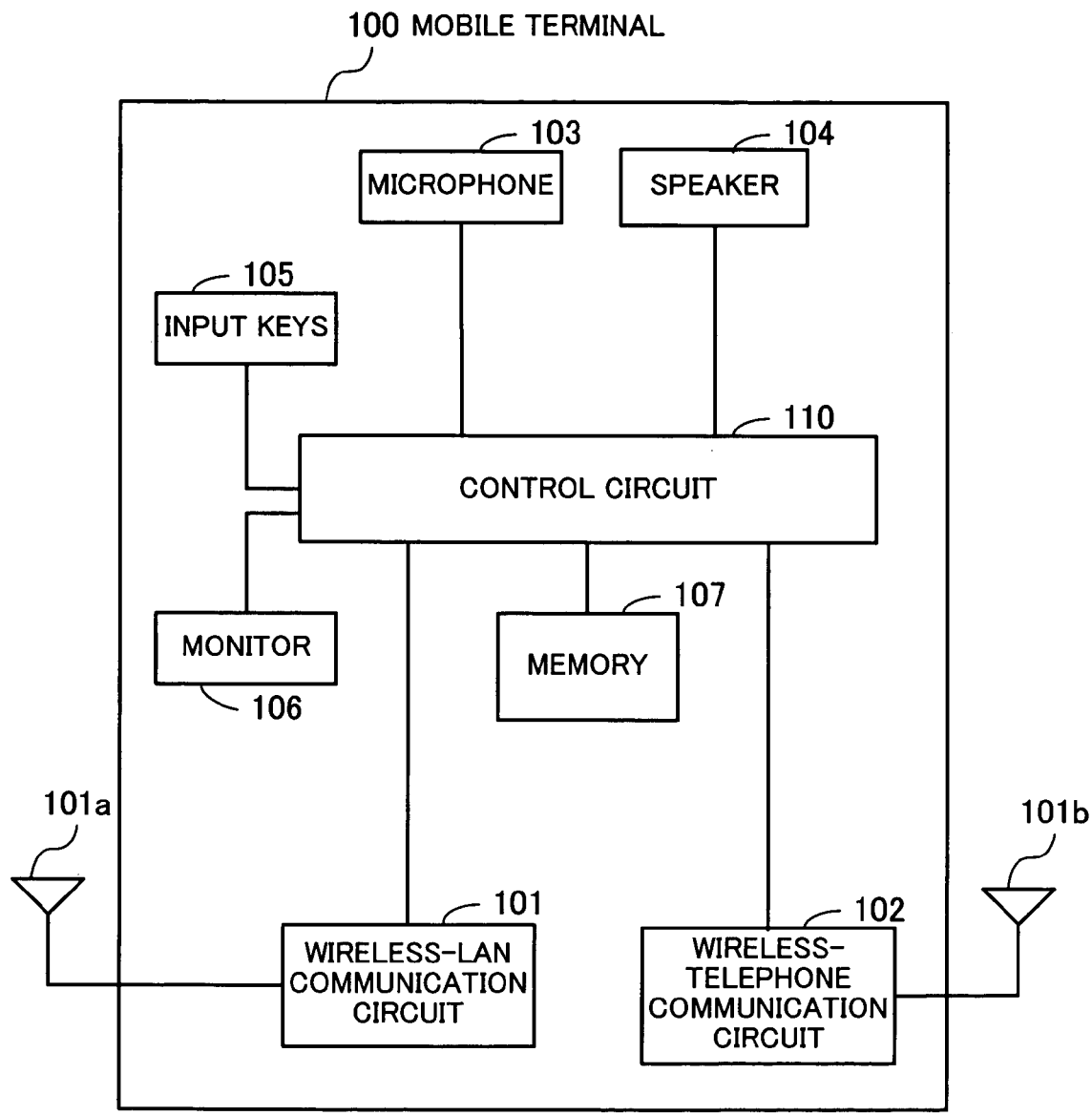
FIG. 3 is a diagram illustrating an example of a hardware construction realizing a mobile terminal.

FIG. 3 is a diagram illustrating an example of a hardware construction realizing each of the mobile terminals. The entire mobile terminal 100 is controlled by a control circuit 110. The control circuit 110 is connected to a wireless-LAN communication circuit 101, a wireless-telephone communication circuit 102, a microphone 103, a speaker 104, input keys 105, a monitor 106, and a memory 107.

The wireless-LAN communication circuit 101 performs wireless data communication with the wireless LAN access point 23 through an antenna 101a. The wireless-telephone communication circuit 102 performs wireless data communication with a base station of the mobile telephone network through an antenna 101b.

The microphone 103 passes to the control circuit 110 voice information representing voice inputted by a user. The speaker 104 outputs voice based on voice data outputted from the control circuit 110.

The input keys 105 include numerical keypads, and pass to the control circuit 110 a signal corresponding to a key which is pressed down by the user. The monitor 106 is, for example, a liquid-crystal display device, and displays image data transferred from the control circuit 110.

The memory 107 stores programs describing details of processing to be executed by the control circuit 110, data necessary for the processing, and the like.

Next, functions realized in the mobile terminal 100 which has the above hardware construction are explained below.

Figure 4:
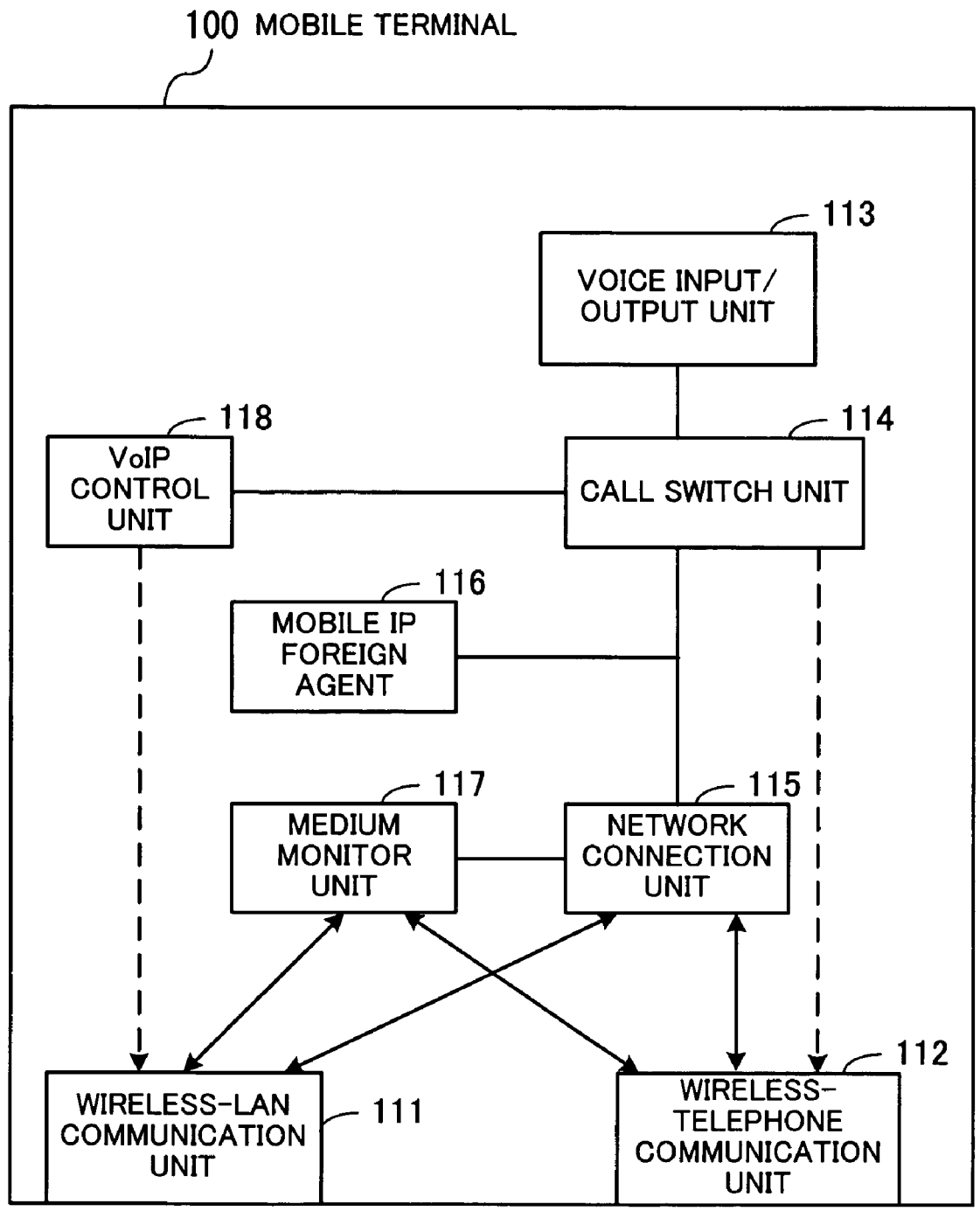
FIG. 4 is a block diagram illustrating functions of the mobile terminal.

FIG. 4 is a block diagram illustrating functions of the mobile terminal 100. The mobile terminal 100 comprises a wireless-LAN communication unit 111, a wireless-telephone communication unit 112, a voice input/output unit 113, a call switch unit 114, a network connection unit 115, a mobile IP foreign agent (FA) 116, a medium monitor unit 117, and a VoIP control unit 118. These functions are realized by the control circuit 110 controlling the devices around the control circuit 110.

The wireless-LAN communication unit 111 performs communication with the call-management server 200 through the wireless LAN or the Internet 11. In addition, when the call-management server 200 establishes a connection between the wireless-LAN communication unit 111 and the IP telephone 21, the wireless-LAN communication unit 111 performs communication with the IP telephone 21.

The wireless-telephone communication unit 112 performs communication with the call-management server 200 through the mobile telephone network 10. In addition, when the call-management server 200 establishes a connection between the wireless-telephone communication unit 112 and the IP telephone 21, the wireless-telephone communication unit 112 performs communication with the IP telephone 21.

The voice input/output unit 113 controls voice input into the microphone 103 and voice output to the speaker 104. Specifically, the voice input/output unit 113 converts a voice signal inputted from the microphone 103, into a digital signal, and passes the digital signal to the call switch unit 114. In addition, when the voice input/output unit 113 receives voice data from the call switch unit 114, the voice input/output unit 113 converts the voice data into an analog voice signal so that the speaker 104 outputs voice.

The call switch unit 114 activates the VoIP control unit 118 and performs a telephone dialing operation in response to a request from the user for a call. In addition, when the mobile terminal 100 receives an incoming call, and a communication circuit through an interface network is selected, the call switch unit 114 activates the VoIP control unit 118. Further, the call switch unit 114 switches calls between the wireless LAN and the wireless telephone network according to the conditions of a connection through the wireless LAN and a connection through the wireless telephone network. The network connection unit 115 supplies an instruction for the switching operation to the call switch unit 114.

When a connection through the Internet 11 is selected as a connection for use, the call switch unit 114 passes data to the VoIP control unit 118, and receives data from the VoIP control unit 118. In addition, when a connection through the mobile telephone network 10 is selected as a connection for use, the call switch unit 114 passes data to the wireless-telephone communication unit 112, and receives data from the wireless-telephone communication unit 112. Further, the call switch unit 114 notifies the call-management server 200 of the condition of the selected connection.

The network connection unit 115 selects a connection for use in a call, according to monitoring information which is supplied from the medium monitor unit 117, and notifies the call switch unit 114 of type of the selected connection. In addition, the network connection unit 115 supplies an instruction for a specific operation to the wireless-LAN communication unit 111 and the wireless-telephone communication unit 112. For example, the instruction for a specific operation is an instruction to wait in a state in which the mobile terminal 100 is on standby for an incoming call, an instruction to stop operation, or an instruction to start operation.

The mobile IP foreign agent 116 supports operations for roaming for LAN connections. That is, the mobile IP foreign agent 116 cooperates with the mobile IP home agent 22 (which is arranged on the network side) for maintaining sessions using LAN connections. Specifically, the mobile IP foreign agent 116 notifies the mobile IP home agent 22 of the position of the mobile terminal 100 on a network containing the wireless LAN. For example, the position of the mobile terminal 100 can be represented by using identification information identifying a wireless LAN access point through which communication is possible.

A mechanism which enables transparent movement of a terminal on the Internet by use of the mobile IP foreign agent 116 and the mobile IP home agent 22 illustrated in FIG. 2 is standardized as RFC 2002 by the IETF (Internet Engineering Task Force), which is an organization for standardizing protocols related to the Internet. Based on RFC 2002, it is possible to use the original IP address even when the mobile terminal 100 moves to a different subnetwork.

The medium monitor unit 117 monitors the conditions of the network mediums. That is, the medium monitor unit 117 monitors the conditions of the wireless-LAN communication unit 111 and the wireless-telephone communication unit 112, and passes to the network connection unit 115 information on the conditions of the connections connected to the wireless-LAN communication unit 111 and the wireless-telephone communication unit 112.

The VoIP control unit 118 performs VoIP communication of voice data by data communication through the wireless-LAN communication unit 111. Specifically, when the VoIP control unit 118 receives voice data from the call switch unit 114, the VoIP control unit 118 generates VoIP packets, and passes the VoIP packets to the wireless-LAN communication unit 111. In addition, when the VoIP control unit 118 receives VoIP packets from the wireless-LAN communication unit 111, the VoIP control unit 118 reproduces the original voice data, and passes the reproduced voice data to the call switch unit 114.

Next, the call-management server 200 is explained below.

Figure 5:
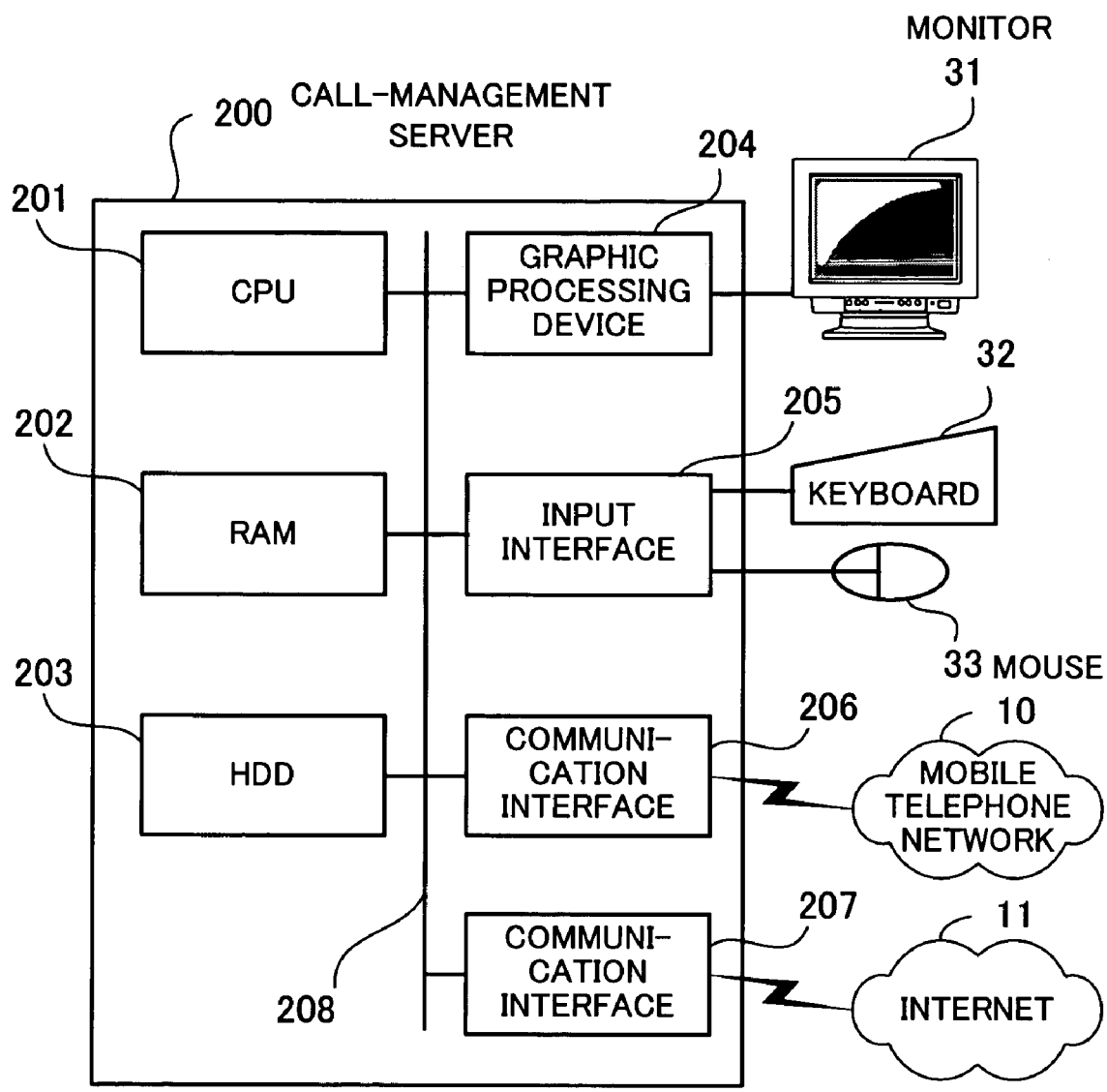
FIG. 5 is a diagram illustrating an example of a hardware construction realizing a call-management server.

FIG. 5 is a diagram illustrating an example of a hardware construction realizing the call-management server 200. The entire call-management server 200 is controlled by a CPU (central processing unit) 201, to which a RAM (random access memory) 202, an HDD (hard disk drive) 203, a graphic processing device 204, an input interface 205, and communication interfaces 206 and 207 are connected through a bus 208.

The RAM 202 temporarily stores at least portions of an OS (operating system) program and application programs which are executed by the CPU 201, as well as various types of data necessary for processing by the CPU 201. The HDD 203 stores the OS and application programs.

A monitor 31 is connected to the graphic processing device 204, which makes the monitor 31 display an image on a screen in accordance with an instruction from the CPU 201. A keyboard 32 and a mouse 33 are connected to the input interface 205, which transmits signals sent from the keyboard 32 and the mouse 33, to the CPU 201 through the bus 208.

The communication interface 206 is connected to the mobile telephone network 10, and exchanges data with the mobile terminals 100 and 100a through the mobile telephone network 10.

The communication interface 207 is connected to the Internet 11, and exchanges data with the mobile terminals 100 and 100a through the Internet 11.

By using the above hardware construction, it is possible to realize the following functions in the call-management server 200.

Figure 6:
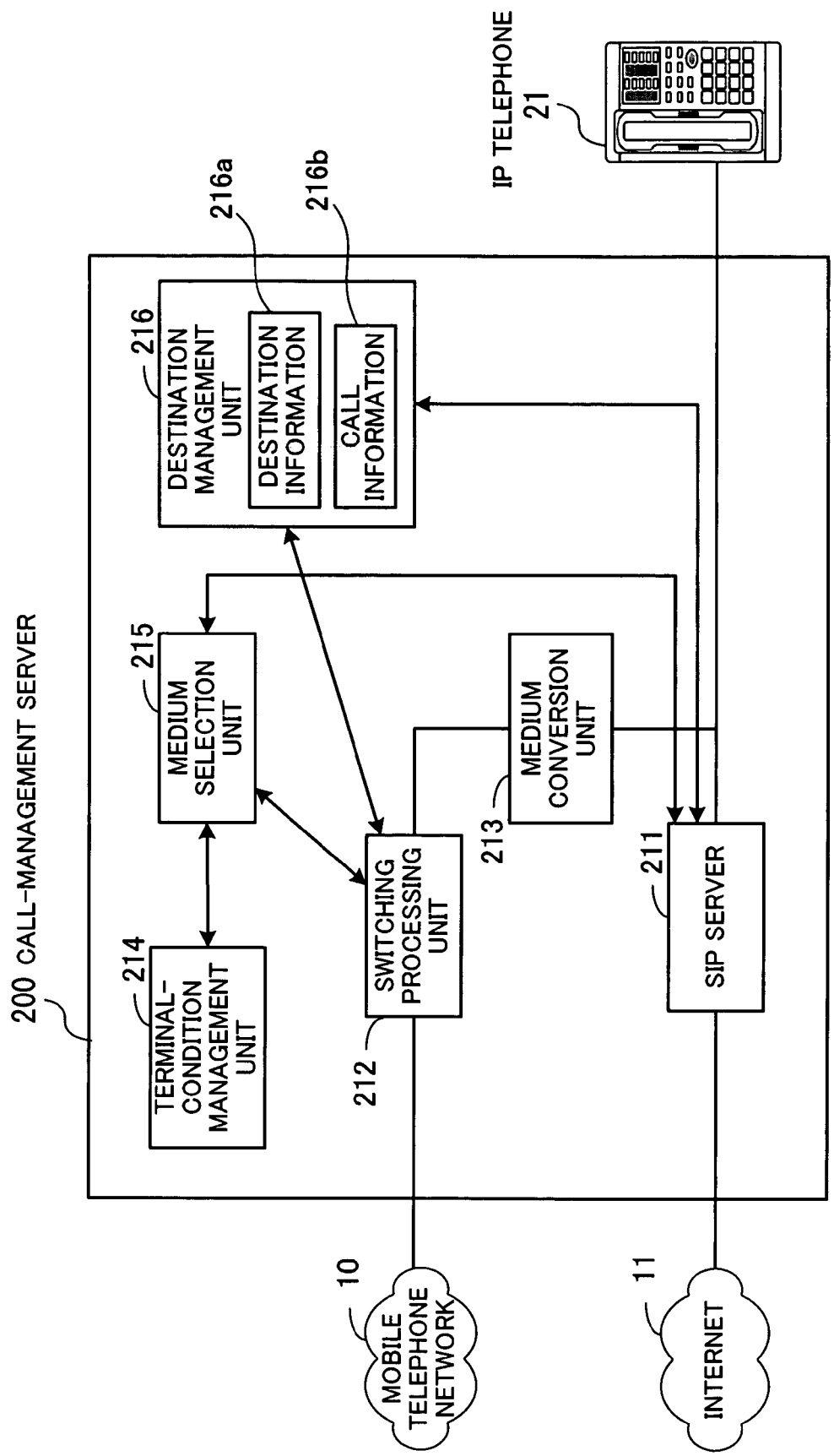
FIG. 6 is a block diagram illustrating functions of the call-management server.

FIG. 6 is a block diagram illustrating the functions of the call-management server 200. The call-management server 200 comprises an SIP server 211, a switching processing unit 212, a medium conversion unit 213, a terminal-condition management unit 214, a medium selection unit 215, and a destination management unit 216.

The SIP server 211 manages communication through the Internet 11 using the SIP (Session Initiation Protocol), which is a communication protocol for setting, releasing, and controlling sessions, where each of the sessions is formed with a series of VoIP messages.

The switching processing unit 212 performs communication with the mobile terminals 100 and 100a through the mobile telephone network 10.

The medium conversion unit 213 performs medium conversion (i.e., conversion of data formats) between the VoIP data format and the data format of information transmitted through the mobile telephone network 10.

The terminal-condition management unit 214 acquires information on the conditions of terminals (including the conditions of networks) from the mobile terminals 100 and 100a, and manages the acquired information.

The medium selection unit 215 selects an optimum medium based on the conditions of terminals when a call is originated from the network side. (According to the present embodiment, the connection through the wireless LAN has higher priority.)

The destination management unit 216 manages destinations of calls (e.g., SIP addresses of respective users). For example, when a call is originated by dialing or VoIP from a mobile terminal during a VoIP call or a voice call through the mobile telephone network 10 to or from the same mobile terminal, the destination management unit 216 requests the SIP server 211 and the switching processing unit 212 to establish a connection so that a three-way call is realized. After the connection realizing the three-way call is established, the connection for one of the two calls is disconnected. Thus, it is possible to prevent interruption of communication with the mobile terminal.

In addition, in order to manage the destinations of calls, the destination management unit 216 holds destination information 216a and call information 216b.

FIG. 7 is a diagram illustrating an example of a data structure of the destination information.

The destination information 216a includes fields of "USER," "DESTINATION," "PRIORITY," "CONDITION," and "TERMINAL IDENTIFICATION." In the field "USER," a virtual ID of a user which has each destination is set. In the field "DESTINATION," information indicating each destination which a mobile terminal of each user has is set. For example, the information indicating a destination is an SIP address (e.g., "01234567@telgw.abcd.com"), an address (e.g., an IP address) of the mobile terminal, an address (e.g., a URI (Uniform Resource Identifier)) of the mobile terminal as an IP telephone, or the like. In the field "PRIORITY," the priority of the corresponding destination is indicated in three levels (high, medium, and low) in the case where there are a plurality of destinations corresponding to a user. A connection corresponding to a destination having higher priority is more preferentially used in a call to the corresponding mobile terminal. In the field "CONDITION," information indicating the condition of a connection through a communication medium corresponding to each destination (e.g., information indicating whether or not each destination is usable) is set. The terminal-condition management unit 214 manages the information indicating the condition of each connection, and updates the information when necessary. In the field "TERMINAL IDENTIFICATION," an identifier for identifying a mobile terminal (e.g., a mobile terminal or an IP telephone) corresponding to each destination is set.

When the above destination information 216a is referred to, it is possible to determine the identity of a terminal which originates, continues, and receives a call through the wireless LAN and a terminal which originates, continues, and receives a call through the mobile telephone network.

FIG. 8 is a diagram illustrating an example of a data structure of the call information. The call information 216b is information for management of a status corresponding to each request related to a call (e.g., origination of a call or transfer of a call). The call information 216b includes fields of "STATUS OF CALL," "DESTINATION," and "CALLER." In the field "STATUS OF CALL," the status of a call under control (for example, "ORIGINATING," "CONTINUING," or the like) is set. In the field "DESTINATION," information indicating a destination of the call is set. In the field "CALLER," a virtual ID of the caller (user) who originates the call is set.

When the system has the construction as explained above, it is possible to continue a call by automatically switching networks at the terminal side according to the circumstances, and dynamically switching between the telephone call function and the VoIP call function in synchronization with the switching of the networks. In addition, it is possible to realize a standby operation for a VoIP call by using a telephone medium such as a PHS network.

Alternatively, it is possible to distribute the functions of the call-management server 200 over a plurality of servers so that the distributed functions cooperate with each other, instead of arranging the functions in the single call-management server 200.

In the above system, the following processing is performed.

Figure 9:
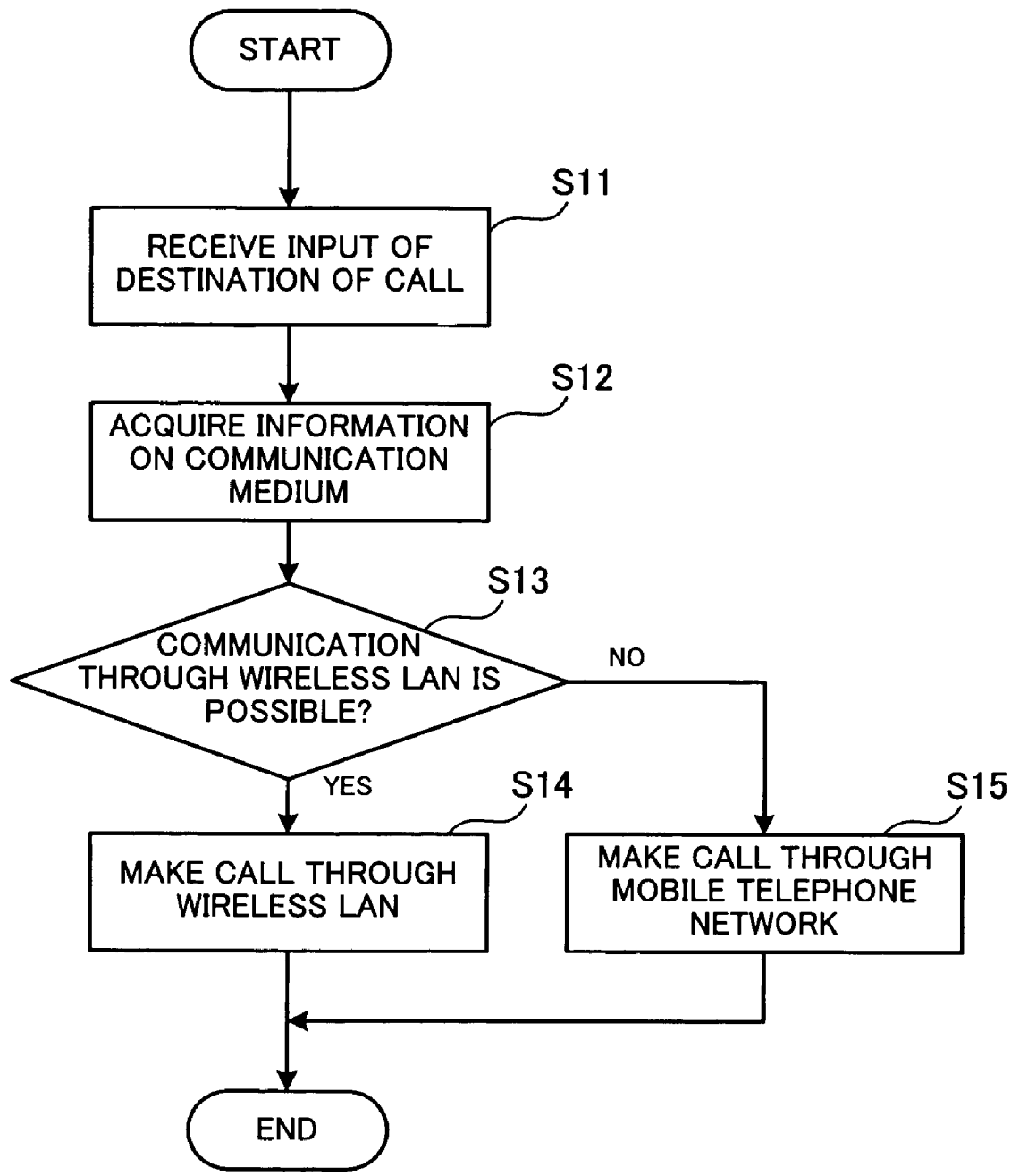
FIG. 9 is a flow diagram illustrating a sequence of processing performed by a mobile terminal when a call is originated by a mobile terminal.

FIG. 9 is a flow diagram illustrating a sequence of processing performed by a mobile terminal when a call is originated by a mobile terminal. The processing illustrated in FIG. 9 is explained below step by step.

[Step S11] The call switch unit 114 receives a destination of a call inputted by a user. Specifically, the call switch unit 114 detects a manipulation of the input keys 105 by the user, and recognizes a destination of a call based on a telephone number designated by the manipulation. In the following explanations, it is assumed that the opposite party is the IP telephone 21.

[Step S12] The call switch unit 114 acquires from the network connection unit 115 information on a communication medium which is currently usable.

Specifically, the call switch unit 114 outputs to the network connection unit 115 a request for information on a communication medium which is currently usable. Then, the network connection unit 115 receives from the medium monitor unit 117 information indicating the conditions of communication at the wireless-LAN communication unit 111 and the wireless-telephone communication unit 112. For example, the medium monitor unit 117 passes to the network connection unit 115 information indicating the intensity of a radio wave which the wireless-LAN communication unit 111 can receive from the wireless LAN access point 23 and information indicating the intensity of a radio wave which the wireless-telephone communication unit 112 can receive from a base station of the mobile telephone network 10.

In the present embodiment, the functions of the wireless-LAN communication unit 111 can be stopped during the absence of communication. In this case, the medium monitor unit 117 confirms the condition of a connection through the wireless LAN by activating the wireless-LAN communication unit 111.

The network connection unit 115 can determine whether or not communication can be realized through each communication medium (i.e., whether or not to be able to secure a condition of communication which can guarantee a predetermined call quality level through each communication medium), based on information on the intensity of a radio wave transmitted through the communication medium from the opposite party at one of the wireless-LAN communication unit 111 and the wireless-telephone communication unit 112 connected to the communication medium. Then, the network connection unit 115 notifies the call switch unit 114 whether or not communication through each communication medium is possible.

[Step S13] The call switch unit 114 determines whether or not communication through the wireless LAN is possible. When yes is determined, the operation goes to step S14. When no is determined, the operation goes to step S15.

[Step S14] The call switch unit 114 initiates a VoIP call through the wireless LAN.

Specifically, the call switch unit 114 outputs to the network connection unit 115 a request for a connection through the wireless LAN. Then, the network connection unit 115 activates the wireless-LAN communication unit 111, which starts communication with the call-management server 200 through the wireless LAN access point 23.

Thereafter, the call switch unit 114 activates the VoIP control unit 118, and performs communication through the VoIP control unit 118. Specifically, the activated VoIP control unit 118 uses VoIP, controls a VoIP call, and performs communication with the IP telephone 21. Then, the call switch unit 114 passes to the VoIP control unit 118 voice data of the user which is transferred from the voice input/output unit 113. The VoIP control unit 118 receives the voice data, converts the received voice data into a data format in accordance with VoIP, and passes the converted voice data to the wireless-LAN communication unit 111. The voice data is transmitted through the wireless-LAN communication unit 111 to the IP telephone 21, which outputs the voice represented by the voice data.

On the other hand, voice of the opposite party inputted into the IP telephone 21 is converted into voice data in the data format accordance with VoIP, and the voice data is transmitted to the wireless-LAN communication unit 111. The wireless-LAN communication unit 111 receives the transmitted voice data, and passes the received voice data to the VoIP control unit 118. The VoIP control unit 118 converts the received voice data into the original format, and passes the converted voice data to the call switch unit 114, which passes the voice data to the voice input/output unit 113. The voice input/output unit 113 outputs the voice represented by the voice data from the speaker 104.

[Step S15] The call switch unit 114 initiates a call through the mobile telephone network 10.

Specifically, the call switch unit 114 outputs to the network connection unit 115 a request for a connection through the wireless telephone network. Then, the network connection unit 115 activates the wireless-telephone communication unit 112. The wireless-telephone communication unit 112 dials the IP telephone 21 through the mobile telephone network 10, and starts communication with the IP telephone 21 through the call-management server 200.

Thereafter, the call switch unit 114 passes to the wireless-telephone communication unit 112 voice data of the user which is transferred from the voice input/output unit 113. The wireless-telephone communication unit 112 transfers the voice data to the call-management server 200 through the mobile telephone network 10. Then, the call-management server 200 transfers the voice data to the IP telephone 21, which outputs the voice represented by the voice data.

On the other hand, voice of the opposite party inputted into the IP telephone 21 is transferred to the call-management server 200, which transmits the voice data to the mobile terminal 100 through the mobile telephone network 10. Then, the voice data is transferred from the wireless-telephone communication unit 112 to the call switch unit 114, which passes the voice data to the voice input/output unit 113. The voice input/output unit 113 outputs the voice represented by the voice data from the speaker 104.

As explained above, it is possible to use VoIP, control a VoIP call, and dials a telephone when only a communication medium having a narrow bandwidth such as a mobile telephone network or a PHS network is usable.

Hereinbelow, processing in the case where the IP telephone 21 makes a call to the mobile terminal 100 is explained below.

Figure 10:
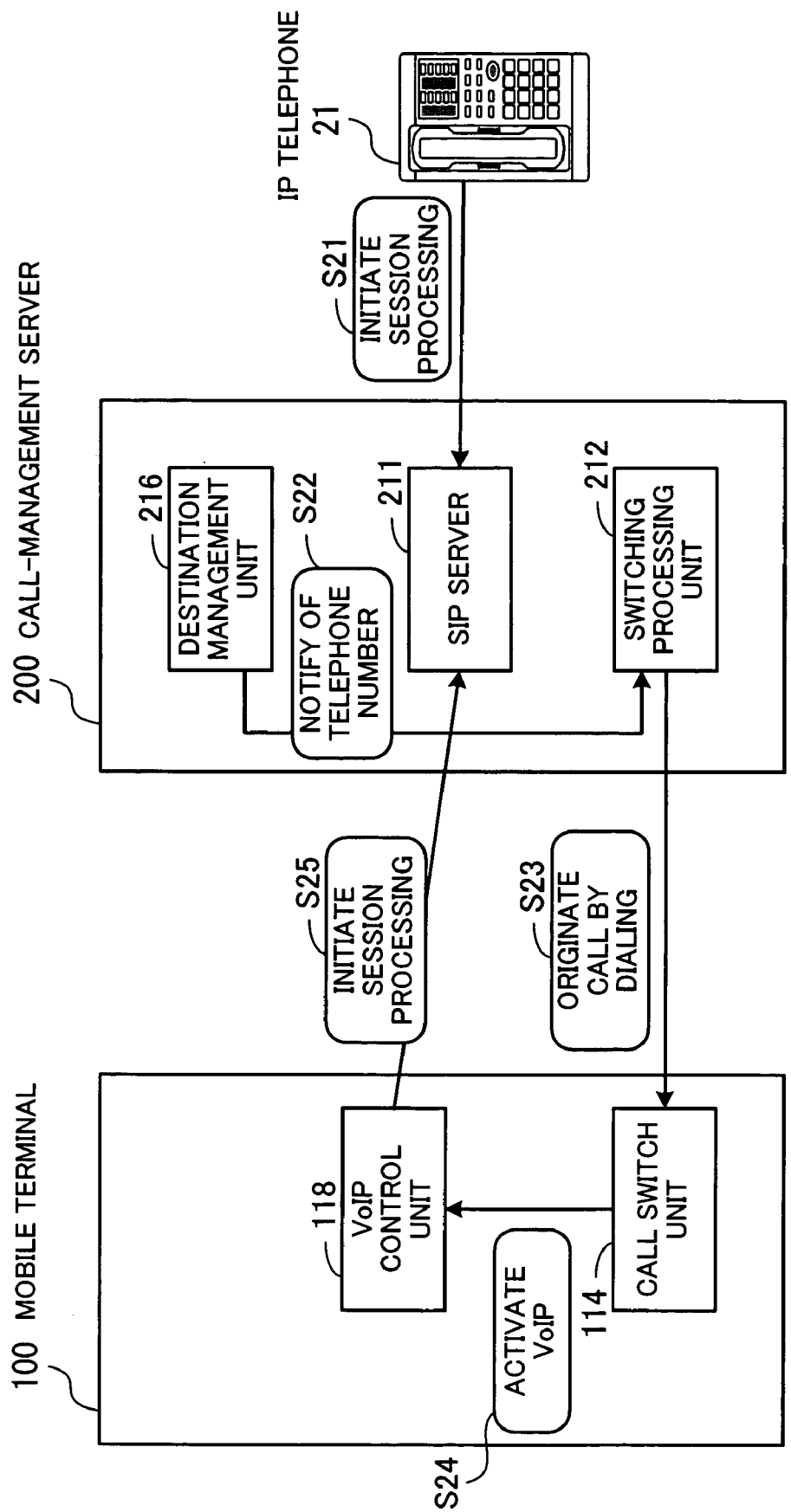
FIG. 10 is a conceptual diagram illustrating processing performed when a call is originated from an IP telephone to the mobile terminal.

FIG. 10 is a conceptual diagram illustrating processing performed when a call is originated from an IP telephone to the mobile terminal. The processing illustrated in FIG. 10 is explained below step by step.

[Step S21] When the IP telephone 21 outputs to the call-management server 200 a request for origination of a call to the mobile terminal 100, session processing in accordance with SIP is started between the IP telephone 21 and the call-management server 200. In the request for origination of a call, which is outputted from the IP telephone 21, the mobile terminal 100 is designated by an SIP address.

[Step S22] The destination management unit 216 in the call-management server 200 searches for the telephone number of the mobile terminal 100, and notifies the switching processing unit 212 of the telephone number. Specifically, the destination management unit 216 holds in advance correspondence relationships between the SIP addresses and the telephone numbers of the mobile terminals 100 and 100a which are under the control of the call-management server 200. Therefore, the destination management unit 216 searches for the telephone number of the mobile terminal 100 based on the SIP address of the mobile terminal 100 designated by the IP telephone 21, and notifies the switching processing unit 212 of the detected telephone number.

[Step S23] The switching processing unit 212 originates a call through the mobile telephone network 10 by dialing the telephone number of which the switching processing unit 212 is notified by the destination management unit 216. Then, the call switch unit 114 in the mobile terminal 100 detects the call from the call-management server 200 as an incoming call.

[Step S24] The call switch unit 114 activates the VoIP control unit 118 when the wireless LAN is usable. When the wireless LAN is not usable, the call switch unit 114 continues the voice call through the mobile telephone network 10. FIG. 10 shows an example in which the wireless LAN is usable.

[Step S25] When the wireless LAN is usable, the VoIP control unit 118 initiates a session between the mobile terminal 100 and the call-management server 200 in accordance with SIP. Thus, A connection for a call is established between the IP telephone 21 and the mobile terminal 100 by the SIP session, and a VoIP call is made between the mobile terminal 100 and the call-management server 200.

Next, details of information exchanged in the processing indicated in FIG. 10 are explained below.

Figure 11:
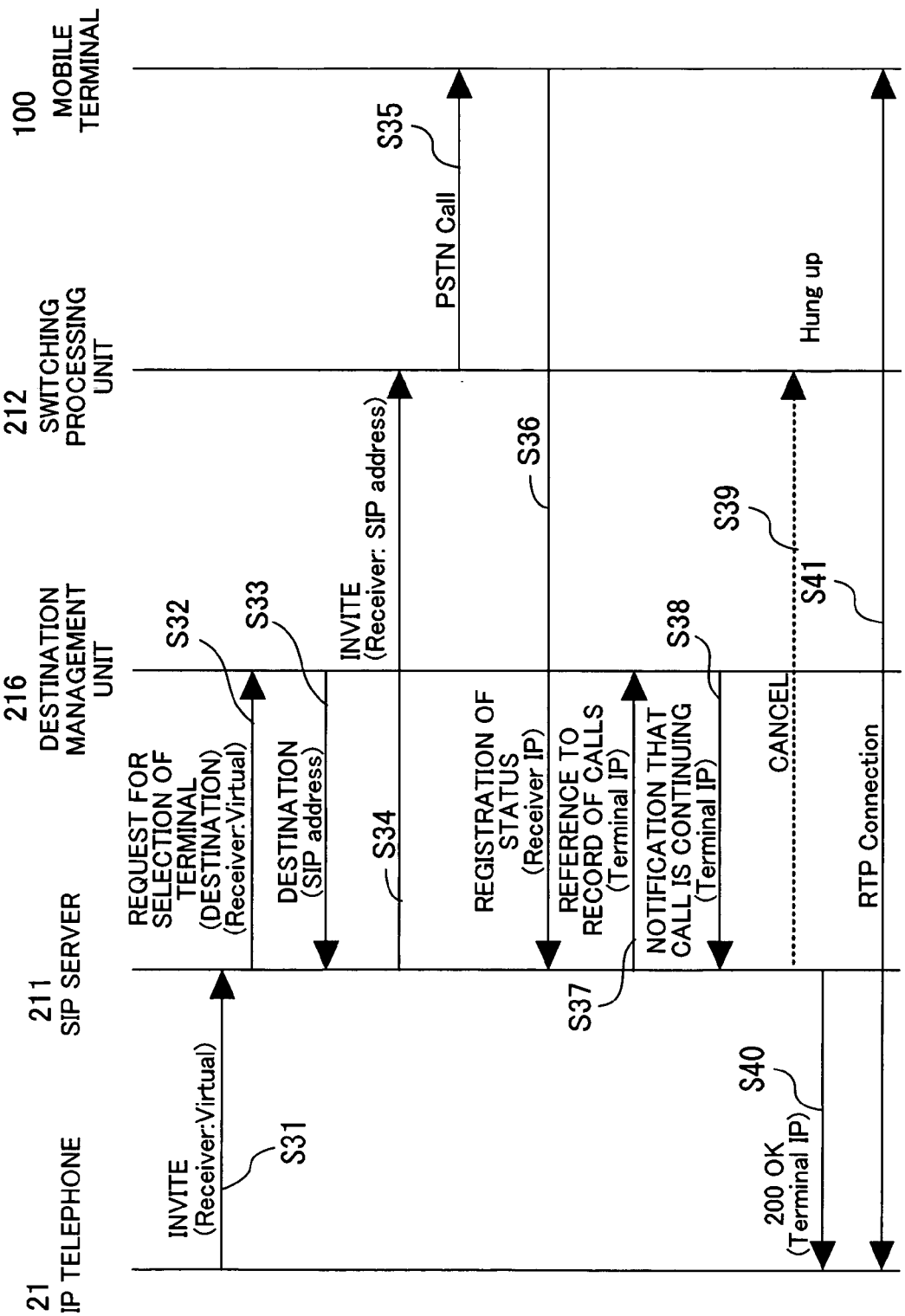
FIG. 11 is a sequence diagram illustrating a sequence of processing performed when the mobile terminal is in a standby state, where a VoIP call is made after an incoming call is received.

FIG. 11 is a sequence diagram illustrating a sequence of processing performed when the mobile terminal is in a standby state. In the case of FIG. 11, a VoIP call is made after an incoming call is received. In FIG. 11, exchanges of information between the IP telephone 21, the SIP server 211, the destination management unit 216, the switching processing unit 212, and the mobile terminal 100 are indicated. The processing illustrated in FIG. 11 is explained below step by step.

[Step S31] The VoIP control unit 118 outputs to the SIP server 211 a request for initiation of a session (INVITE).

[Step S32] The SIP server 211 sends to the destination management unit 216 a request for selection of a terminal (destination). In the request, a user corresponding to the destination is designated by a virtual ID.

When the destination management unit 216 receives the request for selection, the destination management unit 216 selects the destination of the mobile terminal by referring to the destination information 216a. Specifically, at least one destination corresponding to the designated virtual ID and having the condition of the connection "USABLE" is extracted, and a destination having the highest priority is selected from among the at least one extracted destination. In this example, it is assumed that the SIP address of the mobile terminal 100 on the mobile telephone network 10 is selected as the destination. After the destination is selected, the destination management unit 216 registers, as a new record in the call information 216b, information on the selected destination, the caller, and the status of the call "ORIGINATING."

[Step S33] The destination management unit 216 passes to the SIP server 211 information on the selected destination (including the SIP address of the mobile terminal 100).

[Step S34] The SIP server 211 outputs to the switching processing unit 212 a request for initiation of a session (INVITE), in which the destination outputted from the destination management unit 216 is designated.

[Step S35] The switching processing unit 212 converts the SIP address received from the SIP server 211, into a telephone number, and originates a PSTN (Public Switched Telephone Network) call to the mobile terminal 100 by dialing.

[Step S36] The mobile terminal 100 recognizes the call originated by the switching processing unit 212, and detects the condition of the radio wave in the wireless LAN. When the condition of the radio wave is sufficiently good to perform communication, the mobile terminal 100 transmits to the SIP server 211 a request for registration of the status, where the SIP address of the mobile terminal 100 is included in the request.

[Step S37] The SIP server 211 outputs to the destination management unit 216 a request for reference to a record of calls, where the SIP address of the mobile terminal 100 is designated in the request.

[Step S38] The destination management unit 216 refers to the call information 216b, detects that a call to the mobile terminal 100 is being currently originated, and notifies the SIP server 211 that a call is currently continuing.

[Step S39] The SIP server 211 instructs the switching processing unit 212 to cancel the originated call. Thus, the switching processing unit 212 stops the origination of (i.e., hangs up) the call to the mobile terminal 100 through the mobile telephone network 10.

[Step S40] The SIP server 211 transmits to the IP telephone 21 a notification of completion of connection, where the notification contains the IP address of the mobile terminal 100.

[Step S41] The IP telephone 21 establishes a connection with the mobile terminal 100, and makes a call.

Figure 12:
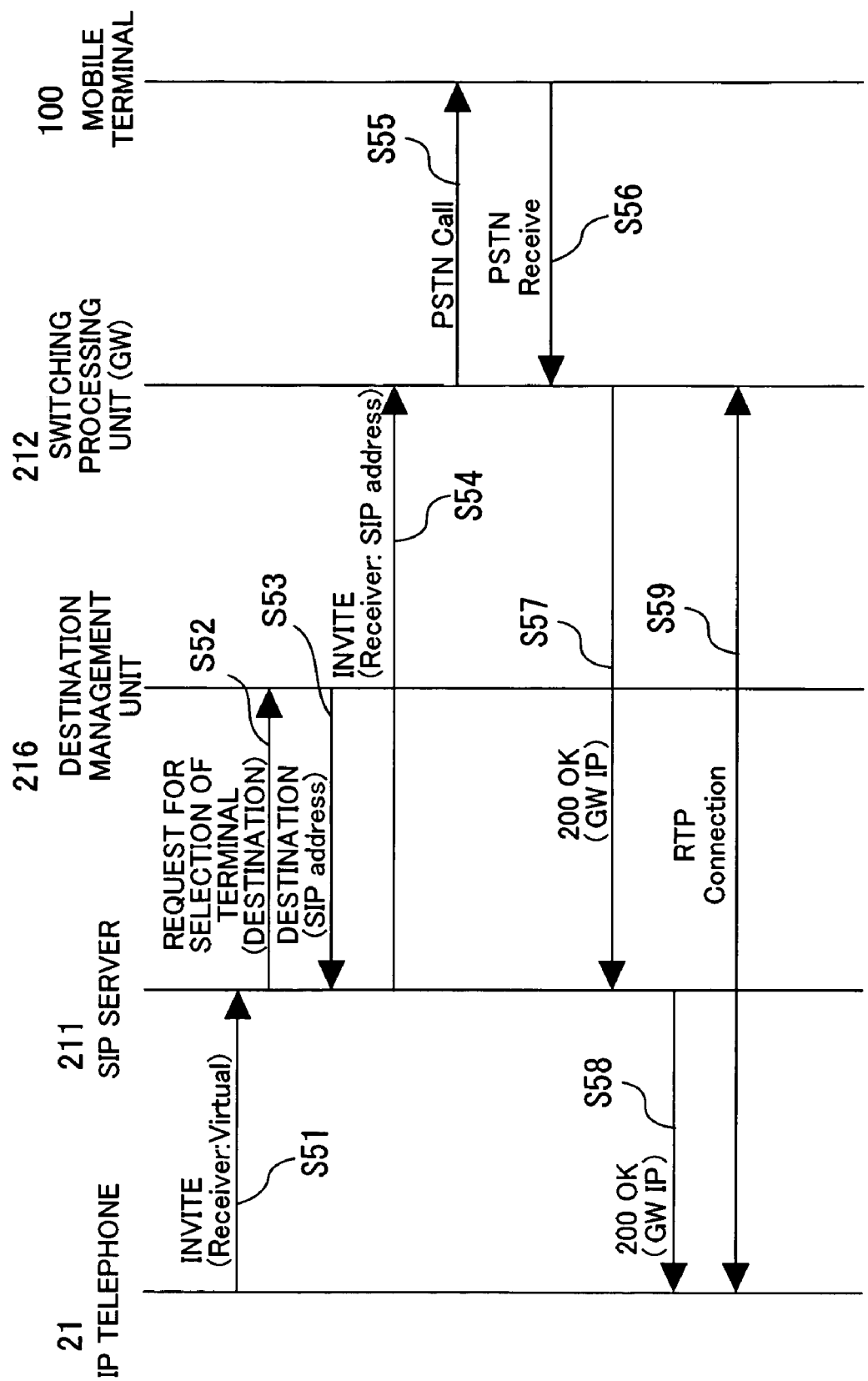
FIG. 12 is a sequence diagram illustrating a sequence of processing performed when the mobile terminal is in a standby state, where a call through a mobile telephone network is made after an incoming call is received.

FIG. 12 is a sequence diagram illustrating a sequence of processing performed when the mobile terminal is in a standby state. In the case of FIG. 12, a call through a mobile telephone network is made after an incoming call is received. In FIG. 12, exchanges of information between the IP telephone 21, the SIP server 211, the destination management unit 216, the switching processing unit 212, and the mobile terminal 100 are indicated. The processing illustrated in FIG. 11 is explained below step by step.

[Step S51] The VoIP control unit 118 outputs to the SIP server 211 a request for initiation of a session (INVITE).

[Step S52] The SIP server 211 sends to the destination management unit 216 a request for selection of a terminal (destination). In the request, a user corresponding to the destination is designated by a virtual ID.

When the destination management unit 216 receives the request for selection, the destination management unit 216 selects the destination of the mobile terminal by referring to the destination information 216a. In this example, it is assumed that the SIP address of the mobile terminal 100 on the mobile telephone network 10 is selected as the destination. After the destination is selected, the destination management unit 216 registers, as a new record in the call information 216b, information on the selected destination, the caller, and the status of the call "ORIGINATING."

[Step S53] The destination management unit 216 passes to the SIP server 211 information on the selected destination (including the SIP address of the mobile terminal 100).

[Step S54] The SIP server 211 outputs to the switching processing unit 212 a request for initiation of a session (INVITE), in which the destination outputted from the destination management unit 216 is designated.

[Step S55] The switching processing unit 212 converts the SIP address received from the SIP server 211, into a telephone number, and originates a PSTN call to the mobile terminal 100 by dialing.

[Step S56] The mobile terminal 100 recognizes the call originated by the switching processing unit 212, and detects the condition of the radio wave in the wireless LAN. At this time, the mobile terminal 100 detects that the condition of the radio wave is not sufficiently good to perform communication (i.e., connection through the wireless LAN is impossible), and transmits a PSTN response ("PSTN receive") to the switching processing unit 212.

[Step S57] The switching processing unit 212 transmits to the SIP server 211 a notification of completion of connection, where the notification contains the IP address of the switching processing unit 212.

[Step S58] The SIP server 211 transmits to the IP telephone 21 a notification of completion of connection, where the notification contains the IP address of the switching processing unit 212.

[Step S59] A connection is established between the IP telephone 21 and the switching processing unit 212. Thus, a call between the IP telephone 21 and the mobile terminal 100 through the switching processing unit 212 becomes possible.

As explained before, when a VoIP call is started, the switching processing unit 212 in the call-management server 200 stops the operation for originating a call. Therefore, no call occurs through the mobile telephone network 10, and no telephone bill according to the calling time occurs.

Alternatively, in the case where correspondence relationships between SIP addresses and telephone numbers of opposite parties are held in advance in the mobile terminal 100, the mobile terminal 100 can access the IP telephone 21 as the opposite party, directly or through another ordinary SIP server, without being relayed by the call-management server 200.

In addition, the call switch unit 114 can transmit to the switching processing unit 212 information on a usable communication medium in response to the operation of originating a call performed in step S23. In this case, when the wireless LAN is usable, the SIP server 211 originates a VoIP call to the mobile terminal 100.

As explained above, it is possible to place a call between the mobile terminal 100 and the IP telephone 21. A change can occur in the usable communication medium. When a change occurs in the usable communication medium during a call, the call switch unit 114 receives from the network connection unit 115 a notification of a usable communication medium. Then, according to the notification of the usable communication medium, the call switch unit 114 initiates a call through the wireless LAN by activating the VoIP control unit 118, or a call through the mobile telephone network 10 by telephone dialing.

When calls are switched, the call-management server 200 temporarily realizes an arrangement for a three-way call during the above operation by the call switch unit 114.

In addition, the mobile IP technology is used for switching networks between wireless LANs and wired LANs. Therefore, when viewed from an application, it is possible to maintain a call without changing an IP address.

Next, switching (roaming) from a VoIP call to a voice call through the mobile telephone network 10 is explained below.

Figure 13:
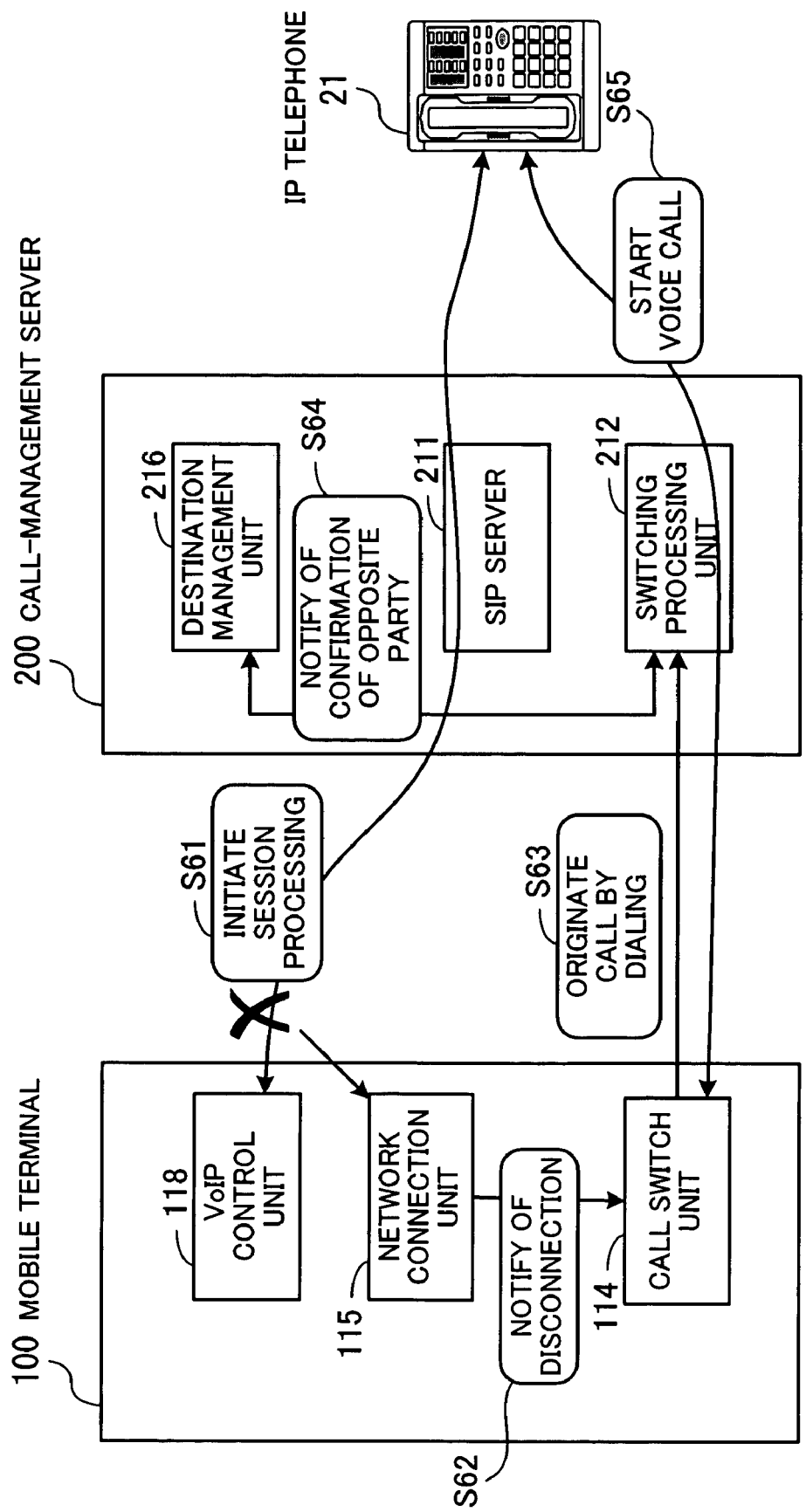
FIG. 13 is a diagram illustrating processing for switching (roaming) from a VoIP call to a voice call through the mobile telephone network.

FIG. 13 is a diagram illustrating processing for switching (roaming) from a VoIP call to a voice call through the mobile telephone network. The processing illustrated in FIG. 13 is explained below step by step.

[Step S61] After an SIP session is initiated between the mobile terminal 100 and the IP telephone 21, a VoIP call is started.

[Step S62] Thereafter, when communication through the wireless LAN becomes impossible (for example, when the condition of the communication deviates from a predetermined criterion), the network connection unit 115 notifies the call switch unit 114 of the condition of the communication.

[Step S63] The call switch unit 114 originates a call to the switching processing unit 212 in the call-management server 200 by dialing.

[Step S64] The call-management server 200 confirms that the opposite party of the originated call is identical to the opposite end of the session, and notifies the switching processing unit 212 of the result of the confirmation. Specifically, the destination management unit 216 detects that the mobile terminal 100 has dialed the call-management server 200 during the VoIP call between the IP telephone 21 and the mobile terminal 100.

[Step S65] The switching processing unit 212 realizes a voice call through the mobile telephone network 10 while the VoIP call which has already been established still continues. Thereafter, the SIP server 211 disconnects the session which has been established through the Internet 11 between the mobile terminal 100 and the call-management server 200.

Figure 14:
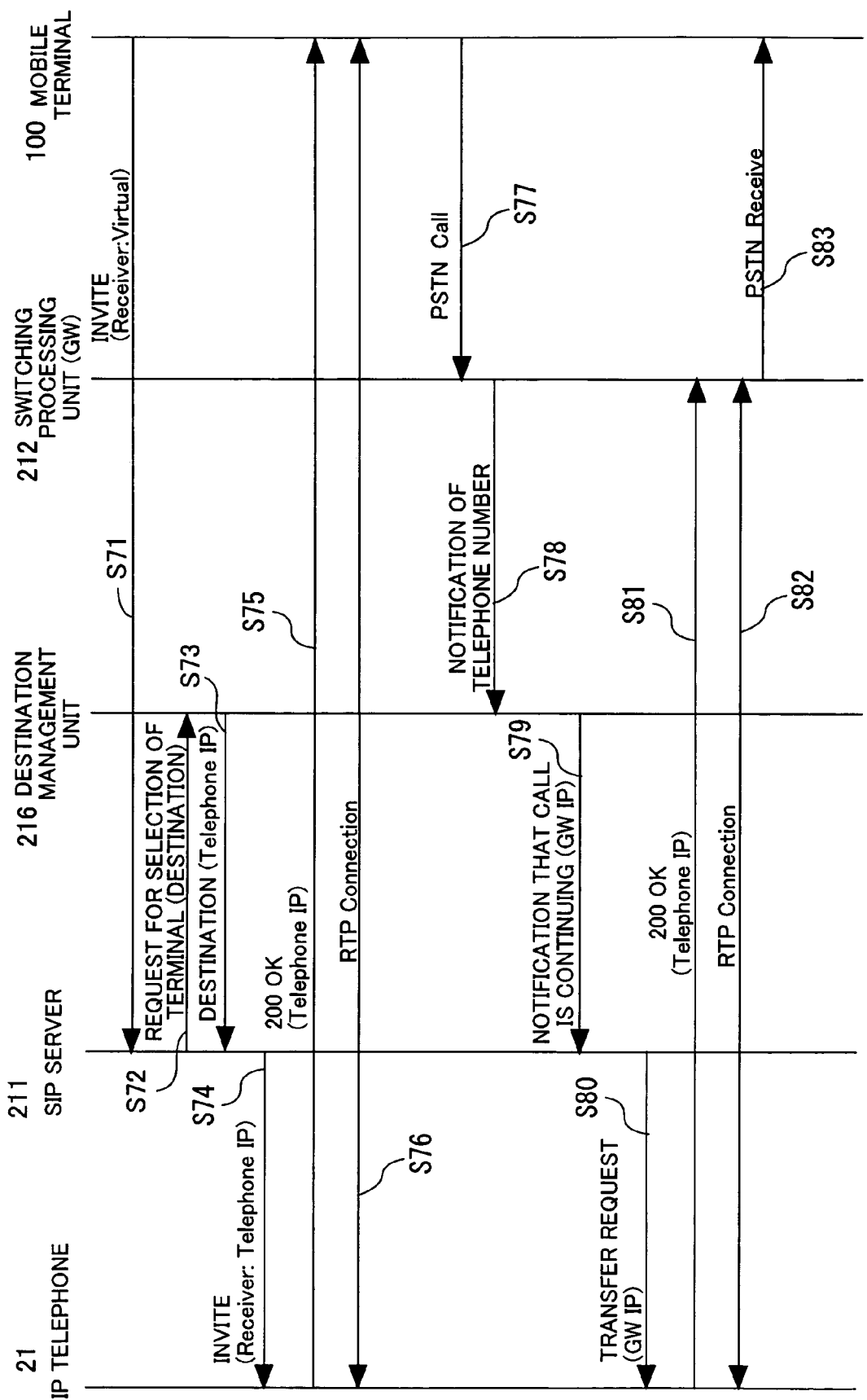
FIG. 14 is a sequence diagram illustrating a sequence of processing for switching (roaming) from a VoIP call to a voice call through the mobile telephone network.

FIG. 14 is a sequence diagram illustrating a sequence of processing for switching (roaming) from a VoIP call to a voice call through the mobile telephone network. In FIG. 14, exchanges of information between the IP telephone 21, the SIP server 211, the destination management unit 216, the switching processing unit 212, and the mobile terminal 100 are indicated. The processing illustrated in FIG. 14 is explained below step by step.

[Step S71] The mobile terminal 100 outputs to the SIP server 211 a request for initiation of a session (INVITE). In the request, the virtual ID of the IP telephone 21 is designated as the destination.

[Step S72] The SIP server 211 sends to the destination management unit 216 a request for selection of a destination. The destination management unit 216 selects a destination corresponding to the mobile terminal by referring to the destination information 216a. In this example, it is assumed that the SIP address of the IP telephone 21 is selected as the destination corresponding to the mobile terminal. After the destination is selected, the destination management unit 216 registers, as a new record in the call information 216b, information on the selected destination, the caller, and the status of the call "ORIGINATING."

[Step S73] The destination management unit 216 passes to the SIP server 211 information on the selected destination (including the SIP address of the IP telephone 21).

[Step S74] The SIP server 211 outputs to the IP telephone 21 a request for initiation of a session (INVITE), in which the destination outputted from the destination management unit 216 is designated.

[Step S75] The IP telephone 21 transmits to the mobile terminal 100 a notification of completion of session connection.

[Step S76] A VoIP call between the mobile terminal 100 and the IP telephone 21 is started.

[Step S77] Thereafter, the mobile terminal 100 detects the condition of the radio wave. When the mobile terminal 100 determines that use of the wireless LAN is impossible, the mobile terminal 100 originates a PSTN call to the switching processing unit 212 by dialing.

[Step S78] The switching processing unit 212 notifies the destination management unit 216 of the telephone number of the destination.

[Step S79] The destination management unit 216 refers to the call information 216b, detects that a call to the IP telephone 21 is originated during another call. Then, the destination management unit 216 notifies the SIP server 211 of the IP address of the switching processing unit 212 and the fact that another call is currently continuing.

[Step S80] The SIP server 211 transmits to the IP telephone 21 a transfer request in which the IP address of the switching processing unit 212 is designated.

[Step S81] The IP telephone 21 transmits to the switching processing unit 212 a notification of completion of session connection, where the IP address of the IP telephone 21 is designated in the notification.

[Step S82] A connection for originated call is established between the IP telephone 21 and the switching processing unit 212.

[Step S83] The switching processing unit 212 returns to the mobile terminal 100 a response to the origination of the call by dialing, and establishes a connection through the mobile telephone network 10. Thus, a call between the IP telephone 21 and the mobile terminal 100 becomes possible.

Next, switching (roaming) from a voice call through the mobile telephone network to a VoIP call is explained below.

Figure 15:
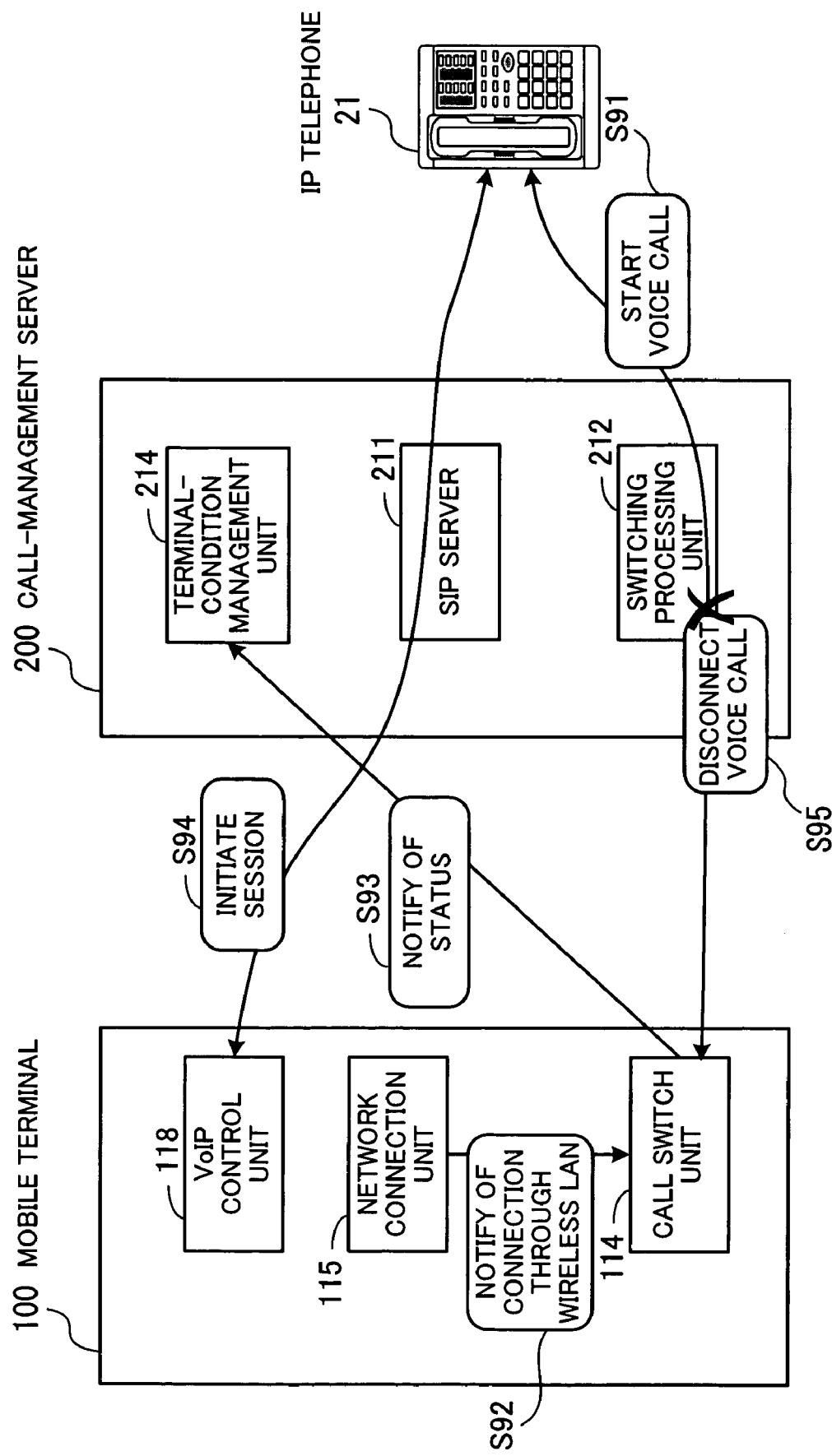
FIG. 15 is a diagram illustrating processing for switching (roaming) from a voice call through the mobile telephone network to a VoIP call.

FIG. 15 is a diagram illustrating processing for switching (roaming) from a voice call through the mobile telephone network to a VoIP call. The processing illustrated in FIG. 15 is explained below step by step.

[Step S91] A voice call between the mobile terminal 100 and the IP telephone 21 is started.

[Step S92] Thereafter, when the condition of communication between the mobile terminal 100 and the wireless LAN access point 23 is restored, the network connection unit 115 notifies the call switch unit 114 that a network connection is established through the wireless LAN.

[Step S93] The call switch unit 114 in the mobile terminal 100 notifies the terminal-condition management unit 214 in the call-management server 200 of the establishment of the connection through the wireless LAN.

[Step S94] The SIP server 211 initiates an SIP session between the IP telephone 21 and the mobile terminal 100. When an SIP session which has been on hold exists, the SIP server 211 revives the SIP session which has been on hold.

[Step S95] The switching processing unit 212 disconnects the connection for the voice call through the mobile telephone network 10.

Figure 16:
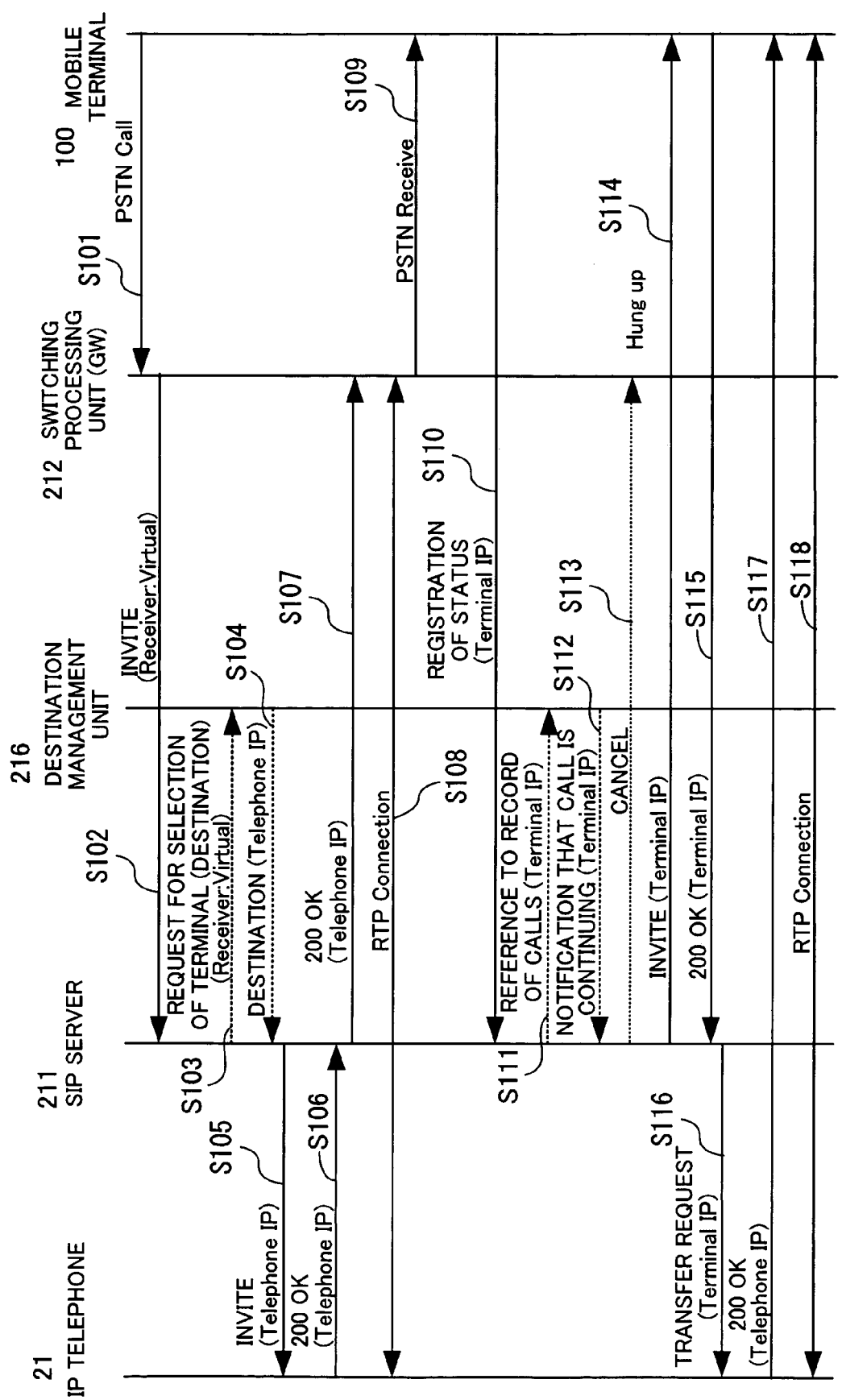
FIG. 16 is a sequence diagram illustrating a sequence of processing for switching (roaming) from a voice call through the mobile telephone network to a VoIP call.

FIG. 16 is a sequence diagram illustrating a sequence of processing for switching (roaming) from a voice call through the mobile telephone network to a VoIP call. In FIG. 16, exchanges of information between the IP telephone 21, the SIP server 211, the destination management unit 216, the switching processing unit 212, and the mobile terminal 100 are indicated. The processing illustrated in FIG. 16 is explained below step by step.

[Step S101] The mobile terminal 100 originates a PSTN call to the switching processing unit 212 by dialing.

[Step S102] The switching processing unit 212 notifies the SIP server 211 of a virtual ID of the destination.

[Step S103] The SIP server 211 outputs to the destination management unit 216 a request for selection of a destination. The destination management unit 216 refers to the destination information 216a, and selects a destination corresponding to the mobile terminal. In this example, it is assumed that the SIP address of the IP telephone 21 is selected as the destination corresponding to the mobile terminal. After the destination is selected, the destination management unit 216 registers, as a new record in the call information 216b, information on the selected destination, the caller, and the status of the call "ORIGINATING."

[Step S104] The destination management unit 216 passes to the SIP server 211 information on the selected destination (including the SIP address of the IP telephone 21).

[Step S105] The SIP server 211 outputs to the IP telephone 21 a request for initiation of a session (INVITE), in which the destination outputted from the destination management unit 216 is designated.

[Step S106] The IP telephone 21 transmits to the SIP server 211 a notification of completion of session connection.

[Step S107] The SIP server 211 transmits to the switching processing unit 212 a notification of completion of session connection.

[Step S108] A connection for the call is established between the IP telephone 21 and the switching processing unit 212.

[Step S109] The switching processing unit 212 returns to the mobile terminal 100 a response to the origination of the call by dialing, and establishes a connection through the mobile telephone network 10. Thus, the call between the IP telephone 21 and the mobile terminal 100 becomes possible.

[Step S110] Thereafter, the mobile terminal 100 detects the condition of the radio wave. When the condition of the radio wave is sufficiently good to perform communication, the mobile terminal 100 transmits to the SIP server 211 a request for registration of the status, where the SIP address of the mobile terminal 100 is included in the request.

[Step S111] The SIP server 211 outputs to the destination management unit 216 a request for reference to a record of calls, where the SIP address of the mobile terminal 100 is designated in the request.

[Step S112] The destination management unit 216 refers to the call information 216b, and notifies the SIP server 211 that a call to the mobile terminal 100 is being currently continuing.

[Step S113] The SIP server 211 instructs the switching processing unit 212 to cancel the originated call. Thus, the switching processing unit 212 stops the origination of (i.e., hangs up) the call to the mobile terminal 100 through the mobile telephone network 10.

[Step S114] The SIP server 211 outputs to the mobile terminal 100 a request for initiation of a session (INVITE).

[Step S115] The mobile terminal 100 transmits to the SIP server 211 a notification of completion of session connection.

[Step S116] The SIP server 211 transmits to the IP telephone 21 a transfer request in which the IP address of the switching processing unit 212 is designated.

[Step S117] The IP telephone 21 transmits to the mobile terminal 100 a notification of completion of session connection.

[Step S118] A connection for a call is established between the IP telephone 21 and the mobile terminal 100.

As explained before, it is possible to continue a call by automatically switching communication mediums at the terminal side according to the circumstances, and dynamically switching between the telephone call and the VoIP call in synchronization with the switching of the communication mediums.

In addition, a standby operation for receiving an incoming call is performed at the wireless-telephone communication unit 112 in the mobile terminal 100, and a VoIP call is placed by establishing a connection to a network such as a wireless LAN with a network device when the mobile terminal 100 receives an incoming call. That is, it is possible to perform a standby operation through the mobile telephone network 10 even while a VoIP call is being made. Thus, it is unnecessary to continuously operate a wireless LAN device, which consumes great electric power, and therefore the battery lasts longer.

Further, as explained before, when the communication medium used in a call is changed, the call-management server 200 temporarily maintains a VoIP call, and the function of a three-way call temporarily maintains both of the connection for the VoIP call and the connection for a voice call through the mobile telephone network 10. Therefore, it is possible to dispense with the processing for reconnection in accordance with SIP, and dynamically and smoothly switch from a voice call through the mobile telephone network 10 to a VoIP call, or from a VoIP call to a voice call through the mobile telephone network 10, so that no interruption of communication occurs.

Furthermore, as explained before, when the condition of the wireless LAN is restored to enable the mobile terminal 100 to perform communication through the wireless LAN, the call-management server 200 is notified of the restored condition, and originates a VoIP call to the mobile terminal 100. That is, it is possible to originate a VoIP call immediately after the condition of the wireless LAN is restored to enable the mobile terminal 100 to perform communication through the wireless LAN.

Moreover, since correspondence relationships between the SIP addresses and the telephone numbers of users are held in advance in the mobile terminal 100, the mobile terminal 100 can access an opposite terminal by directly originating a call to an address of the opposite terminal. That is, the mobile terminal 100 can access the IP telephone as the opposite party, directly or through another ordinary SIP server, without being relayed by the call-management server 200. Therefore, it is possible to reduce the load imposed on the call-management server 200.

The above processing functions can be realized by computers. In this case, programs which describe details of processing realizing the functions which the mobile terminal and call-management server should have are provided. When computers execute the above programs, the processing functions of the mobile terminal and the call-management server according to the present invention are realized on the computers.

The above programs describing the details of processing can be stored in one or more computer-readable recording mediums. The computer-readable recording mediums may be a magnetic recording device, an optical disk, an optical magnetic recording medium, a semiconductor memory, or the like. The magnetic recording device may be a hard disk drive (HDD), a flexible disk (FD), a magnetic tape, or the like. The optical disk may be a DVD (Digital Versatile Disk), a DVD-RAM (Random Access Memory), a CD-ROM (Compact Disk Read Only Memory), a CD-R (Recordable)/RW (Re-Writable), or the like. The optical magnetic recording medium may be an MO (Magneto-Optical Disk) or the like.

In order to put the programs into the market, for example, it is possible to sell a portable recording medium such as a DVD or a CD-ROM in which the programs are recorded. Alternatively, the above programs can be stored in a storage device belonging to a server computer, and transferred from the server computer to the above computers through a network.

The computer which executes each of the above programs stores the program in a storage device belonging to the computer, where the program is originally recorded in, for example, a portable recording medium, or transferred from the server computer. Then, the computer reads the program from the storage device, and performs processing in accordance with the program. Alternatively, the computer may directly read the program from the portable recording medium for performing processing in accordance with the program. Further, the computer can sequentially execute processing in accordance with each portion of the program when the portion of the program is transferred from the server computer.

According to the present invention, when the condition of communication through a wireless LAN deteriorates and deviates from a predetermined criterion during a call through the wireless LAN, the call is switched from a connection through the wireless LAN to a connection through a wireless telephone network. On the other hand, when the condition of communication realized by the call-through-LAN unit is restored to satisfy the predetermined criterion during a call through the wireless telephone network, the call is switched from a connection through the wireless telephone network to a connection through the wireless LAN. Therefore, it is possible to dynamically switch the call between a connection through the wireless LAN and a connection through the wireless telephone network according to the condition of communication so that the wireless LAN is preferentially used.

The foregoing is considered as illustrative only of the principle of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A mobile terminal for making a wireless call, comprising:
   a call-through-LAN unit which has a function of making a call through a wireless LAN;
   a call-through-telephone-network unit which has a function of making a call through a wireless telephone network; and
   a call switch unit which determines a condition of communication realized by the call-through-LAN unit in response to detection of an incoming call that has arrived at the call-through-telephone-network unit via the wireless telephone network, establishes a connection through the call-through-telephone-network unit if the determined condition of communication falls outside a predetermined criterion, and establishes a connection through the call-through-LAN unit if the determined condition of communication satisfies the predetermined criterion.

2. The mobile terminal according to claim 1, wherein said call-through-LAN unit stops operation when the mobile terminal does not perform communication through said wireless LAN, and
   said call-through-telephone-network unit is on standby for an incoming call when the call-through-telephone-network unit is not used for a call.

3. The mobile terminal according to claim 1, wherein said call-through-LAN unit stops operation when the mobile terminal does not perform communication through said wireless LAN, and
   when the call switch unit receives a manipulation input which requests a call to telephone equipment, said call switch unit activates said call-through-LAN unit and determines the condition of communication realized by the call-through-LAN unit, establishes a connection through the call-through-LAN unit in the case where the condition of communication realized by the call-through-LAN unit satisfies said predetermined criterion, and establishes a connection through the call-through-telephone-network unit in the case where the condition of communication realized by the call-through-LAN unit is outside the predetermined criterion.

4. A process for controlling a mobile terminal which includes,
   a call-through-LAN unit which has a function of making a call through a wireless LAN, and stops operation when the mobile terminal does not perform communication through said wireless LAN, and
   a call-through-telephone-network unit which has a function of making a call through a wireless telephone network, and is on standby for an incoming call when the call-through-telephone-network unit is not used for a call;
   said process comprises the steps of:
   (a) determining a condition of communication realized by the call-through-LAN unit in response to detection of an incoming call that has arrived at the call-through-telephone-network unit via the wireless telephone network; and
   (b) establishing a connection through the call-through-telephone-network unit if the determined condition of communication falls outside a predetermined criterion, and establishing a connection through the call-through-LAN unit if the determined condition of communication satisfies the predetermined criterion.

5. A computer-readable storage medium storing a mobile-terminal-control program which makes a computer perform a process for controlling a mobile terminal including,
   a call-through-LAN unit which has a function of making a call through a wireless LAN, and stops operation when the mobile terminal does not perform communication through said wireless LAN, and
   a call-through-telephone-network unit which has a function of making a call through a wireless telephone network, and is on standby for an incoming call when the call-through-telephone-network unit is not used for a call;
   said process comprises the steps of:
   (a) determining a condition of communication realized by the call-through-LAN unit in response to detection of an incoming call that has arrived at the call-through-telephone-network unit via the wireless telephone network; and
   (b) establishing a connection through the call-through-telephone-network unit if the determined condition of communication falls outside a predetermined criterion, and establishing a connection through the call-through-LAN unit if the determined condition of communication satisfies the predetermined criterion.

6. A call-management server for management of calls between telephone equipment and a mobile terminal, comprising:
   a call-through-telephone-network management unit which establishes a connection between said mobile terminal and said telephone equipment through a wireless telephone network when an incoming call from the mobile terminal is received through the wireless telephone network during a call placed between the telephone equipment and the mobile terminal through a wireless LAN; and
   a call-through-LAN management unit which disconnects a first session established with the mobile terminal through said wireless LAN after temporarily realizing a three-way calling state in which both of a connection between the telephone equipment and the mobile terminal through said wireless LAN and said connection between said mobile terminal and said telephone equipment through said wireless telephone network are concurrently maintained, and connects a second session with said mobile terminal through said wireless LAN when information indicating restoration of communication through the wireless LAN is received from said mobile terminal.

7. A call-management process for management of calls between telephone equipment and a mobile terminal in a call-management server, comprising the steps of:
  (a) establishing a connection between said mobile terminal and said telephone equipment through a wireless telephone network when an incoming call from the mobile terminal is received through the wireless telephone network during a call placed between the telephone equipment and the mobile terminal through a wireless LAN;
  (b) disconnecting a first session established with the mobile terminal through said wireless LAN after temporarily realizing a three-way calling state in which both of a connection between the telephone equipment and the mobile terminal through said wireless LAN and said connection between said mobile terminal and said telephone equipment through said wireless telephone network are concurrently maintained;
  (c) establishing a second session with said mobile terminal through said wireless LAN when information indicating restoration of communication through the wireless LAN is received from said mobile terminal; and
  (d) disconnecting said connection between said mobile terminal and said telephone equipment through said wireless telephone network.

8. A computer-readable storage medium storing a call-management-server program which is executed by a computer and makes said computer perform a call-management process for management of calls between telephone equipment and a mobile terminal, said call-management process comprises the steps of:
  (a) establishing a connection between said mobile terminal and said telephone equipment through a wireless telephone network when an incoming call from the mobile terminal is received through the wireless telephone network during a call placed between the telephone equipment and the mobile terminal through a wireless LAN;
  (b) disconnecting a first session established with the mobile terminal through said wireless LAN after temporarily realizing a three-way calling state in which both of a connection between the telephone equipment and the mobile terminal through said wireless LAN and said connection between said mobile terminal and said telephone equipment through said wireless telephone network are concurrently maintained;
  (c) establishing a second session with said mobile terminal through said wireless LAN when information indicating restoration of communication through the wireless LAN is received from said mobile terminal; and
  (d) disconnecting said connection between said mobile terminal and said telephone equipment through said wireless telephone network.

* * * * *